United States Patent
Li et al.

(10) Patent No.: US 12,532,221 B2
(45) Date of Patent: Jan. 20, 2026

(54) DATA TRANSMISSION METHOD AND APPARATUS

(71) Applicant: HUAWEI TECHNOLOGIES CO., LTD., Guangdong (CN)

(72) Inventors: Miao Li, Wuhan (CN); Jindou Chen, Wuhan (CN); Xiaoshu Si, Wuhan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 345 days.

(21) Appl. No.: 18/303,203

(22) Filed: Apr. 19, 2023

(65) Prior Publication Data
US 2023/0262522 A1    Aug. 17, 2023

Related U.S. Application Data

(63) Continuation of application No. PCT/CN2021/114164, filed on Aug. 24, 2021.

(30) Foreign Application Priority Data

Oct. 20, 2020   (CN) ......................... 202011126518.1

(51) Int. Cl.
*H04W 28/00*    (2009.01)
*H04B 17/318*   (2015.01)
*H04W 28/08*    (2023.01)

(52) U.S. Cl.
CPC ...... *H04W 28/0958* (2020.05); *H04B 17/318* (2015.01)

(58) Field of Classification Search
CPC ......................... H04W 28/0958; H04B 17/318
See application file for complete search history.

(56) References Cited

U.S. PATENT DOCUMENTS

2015/0141010 A1*  5/2015  Kludt ................. H04B 7/0434
                                                          455/435.1
2016/0080124 A1   3/2016  Liang et al.
(Continued)

FOREIGN PATENT DOCUMENTS

CN        106255112 A        12/2016
CN        106358248 A  *      1/2017    ........ H04W 36/0066
(Continued)

OTHER PUBLICATIONS

Huawei et al., "FTTR White Leather book," May 14, 2020, 42 pages (with English Translation).
(Continued)

*Primary Examiner* — Erika A Washington
(74) *Attorney, Agent, or Firm* — Fish & Richardson P.C.

(57) ABSTRACT

This application relates to the field of communication technologies, and specifically, to a data transmission method and apparatus. One example method includes: receiving, by a controller, a performance parameter sent by each of the access points, wherein the performance parameter indicates communication performance between the access point that sends the performance parameter and a first station; determining, by the controller based on each received performance parameter, an access point set configured to provide a data transmission service for the first station, wherein the access point set comprises at least one of the plurality of access points; and when the access point set comprises at least two access points, determining, by the controller, a data transmission mode between each of the access points in the access point set and the first station based on the performance parameter sent by each of the access points in the access point set.

20 Claims, 13 Drawing Sheets

(56) References Cited

U.S. PATENT DOCUMENTS

| | | |
|---|---|---|
| 2017/0208006 A1* | 7/2017 | Patil ................. H04W 48/20 |
| 2018/0270728 A1 | 9/2018 | Van Oost et al. |
| 2019/0238190 A1 | 8/2019 | Sun |

FOREIGN PATENT DOCUMENTS

| | | |
|---|---|---|
| CN | 104380809 B | 8/2018 |
| JP | 2016501465 A | 1/2016 |
| WO | 2012172935 A1 | 12/2012 |

OTHER PUBLICATIONS

Li et al., "Consideration on Multi-AP Coordination," IEEE 802.11-19/1129r1, Sep. 6, 2019, 9 pages.
Park et al., "Multi-AP Transmission Procedure," IEEE 802.11-19/0448r1, Mar. 11, 2019, 18 pages.
Office Action in Japanese Appln. No. 2023-524440, mailed on May 27, 2024, 33 pages (with English translation).

\* cited by examiner

DATA TRANSMISSION METHOD AND APPARATUS

CROSS-REFERENCE TO RELATED APPLICATIONS

This application is a continuation of International Application No. PCT/CN2021/114164, filed on Aug. 24, 2021, which claims priority to Chinese Patent Application No. 202011126518.1, filed on Oct. 20, 2020. The disclosures of the aforementioned applications are hereby incorporated by reference in their entireties.

TECHNICAL FIELD

This application relates to the field of communication technologies, and specifically, to a data transmission method and apparatus.

BACKGROUND

A Wireless Fidelity (Wireless-Fidelity, Wi-Fi) network is a widely used wireless local area network (wireless local area network, WLAN), and is usually used in indoor places such as residential environments. The development and popularization of smart home, distance education, home office, live video streaming, and virtual reality (virtual reality, VR) pose high requirements on the bandwidth, latency, and coverage of Wi-Fi networks in residential environments. Therefore, based on fiber to the home (fiber to the home, FTTH), the industry proposes a fiber to the room (fiber to the room, FTTR) network solution.

In an FTTR architecture, a Wi-Fi access point is connected to a network-side device (for example, a gateway (gateway)) of the Wi-Fi access point by using an optical fiber. In this way, data backhaul may be performed over an optical link with high bandwidth and low latency, and no Wi-Fi air interface resource is occupied. This greatly improves a multi-access point coordination effect and data transmission efficiency.

Although the problems such as insufficient Wi-Fi coverage and limited backhaul bandwidth are resolved by using the FTTR architecture, seamless Wi-Fi roaming and high throughput still cannot coexist.

SUMMARY

Embodiments of this application provide a data transmission method and apparatus, to provide a better network access manner and a better data transmission mode for a terminal device.

According to a first aspect, an embodiment of this application provides a data transmission method, applied to a controller. The controller is configured to control a plurality of access points. The method includes: receiving, by the controller, a performance parameter sent by each of the access points, where the performance parameter indicates communication performance between the access point that sends the performance parameter and a first station; determining, by the controller based on each received performance parameter, an access point set configured to provide a data transmission service for the first station, where the access point set includes at least one of the plurality of access points; and when the access point set includes at least two access points, determining, by the controller, a data transmission mode between each of the access points in the access point set and the first station based on the performance parameter sent by each of the access points in the access point set.

That is, a data transmission mode and an access point that provides a data transmission service for a station may be selected based on communication performance between the station and the access point, so that a better network access manner and a better data transmission mode can be provided for the station, thereby improving communication experience of users.

In a possible implementation, the performance parameter includes at least one of a received signal strength indication RSSI of a signal sent by the first station and received by the access point, and load information of the access point.

That is, in this implementation, an access point that provides a data transmission service for a station may be determined based on a load of the access point and a signal strength between the access point and the station, so that an access point with a light load and a high signal strength can be selected to provide the data transmission service for the station.

In a possible implementation, the performance parameter sent by any access point in the determined access point set satisfies that the RSSI is greater than a preset strength threshold, and the load information is less than a preset load threshold.

That is, in this implementation, an access point with a load and a signal strength that satisfy a preset requirement is determined to provide the data transmission service for the station. Therefore, network quality of service of the station can be ensured or improved, and communication experience of users can be improved.

In a possible implementation, the controller is independent of each of the plurality of access points, or the controller is integrated into one of the plurality of access points.

That is, in this implementation, the controller may be flexibly configured to facilitate networking.

In a possible implementation, when the controller is independent of each of the plurality of access points, receiving, by the controller over an optical link or a Wi-Fi channel, the performance parameter sent by each of the access points; or when the controller is integrated into one of the plurality of access points, receiving, by the controller over an optical link or a Wi-Fi channel, the performance parameter sent by each of the access points except the access point in which the controller is located.

That is, in this implementation, a backhaul (backhaul) channel of the access point may be flexibly selected or configured to facilitate networking.

In a possible implementation, the plurality of access points include a first access point and a second access point, and the first station accesses a network through the first access point; and the method further includes: receiving, by the controller, network accessing information of the first station from the first access point; and sending, by the controller, the network accessing information to the second access point.

That is, in this implementation, the access points may share the network accessing information of the station. Therefore, each access point may establish a connection to the station based on the network accessing information of the station.

In a possible implementation, the network accessing information includes association request information and a key.

That is, in this implementation, the network accessing information shared among the access points includes the association request information and the key, and each access point may establish a connection to the station based on the association request information and the key.

In a possible implementation, the plurality of access points include a same basic service set identifier BSSID.

That is, in this implementation, different access points have a same BSSID, so that the station may be simultaneously connected to a plurality of access points.

In a possible implementation, the determining, by the controller, a data transmission mode between each of the access points in the access point set and the first station based on the performance parameter sent by each of the access points in the access point set includes: when the performance parameter corresponding to each of the access points in the access point set does not satisfy a preset performance requirement, determining that different access points in the access point set separately send same data to the first station at different moments.

That is, in this implementation, when a channel environment in which the station is located is poor, the plurality of access points may send the same data to the station, thereby increasing a probability that the station successfully receives the data.

In a possible implementation, the determining, by the controller, a data transmission mode between each of the access points in the access point set and the first station based on the performance parameter sent by each of the access points in the access point set includes: when the performance parameter corresponding to each of the access points in the access point set satisfies a preset performance requirement, determining that different access points in the access point set separately send different data to the first station at a same moment.

That is, in this implementation, when a channel environment in which the station is located is good, the plurality of access points connected to the station may simultaneously send different data to the station, thereby increasing a data throughput of a network.

In a possible implementation, the determining, by the controller, a data transmission mode between each of the access points in the access point set and the first station based on the performance parameter sent by each of the access points in the access point set includes: when a performance parameter of a third access point in the access point set satisfies a preset performance requirement, and access points in the access point set except the third access point do not satisfy the performance requirement, configuring the third access point as a primary access point in the access point set, where the primary access point is configured to independently send data to the first station.

That is, in this implementation, when a channel environment in which the station is located is average, an access point having good communication performance with the station may be selected to provide a data transmission service for the station, so that both communication quality of service of the station and overall network overheads can be ensured.

In a possible implementation, when receiving first data sent by the first station, the primary access point is further configured to send an acknowledge character corresponding to the first data to the first station.

That is, in this implementation, one access point is configured to return an acknowledge character to the station, so that a conflict caused when a plurality of access points return acknowledge characters can be avoided.

In a possible implementation, the access point set includes a fourth access point and a fifth access point; and the determining, by the controller, a data transmission mode between each of the access points in the access point set and the first station based on the performance parameter sent by each of the access points in the access point set includes: configuring a sending moment at which the fourth access point sends uplink resource configuration information to the first station as a first moment; and configuring a sending moment at which the fifth access point sends the uplink resource configuration information to the first station as a second moment, where the second moment is later than the first moment; and when the first station sends uplink data at the second moment in response to the uplink resource configuration information sent by the fourth access point, the fifth access point no longer sends the uplink resource configuration information to the first station.

That is, in this implementation, a sending mechanism of the uplink resource configuration information of the access point is configured, so that a conflict caused when a plurality of access points return acknowledge characters can be avoided.

According to a second aspect, an embodiment of this application provides a data transmission method, applied to a first access point in a plurality of access points controlled by a controller. The method includes: determining, by the first access point, a first performance parameter, where the first performance parameter indicates communication performance between the first access point and a first station; and providing a data transmission service for the first station when the first performance parameter satisfies a preset performance requirement.

That is, the data transmission service is provided for the station only when the communication performance between the access point and the station satisfies the requirement. Therefore, both network quality of service of the station and overall network overheads can be ensured.

In a possible implementation, the method further includes: sending, by the first access point, network accessing information to the controller, where the network accessing information is information obtained by the first access point when the first station accesses a network through the first access point. The controller may send the network accessing information to a second access point in the plurality of access points, so as to share the network accessing information among the plurality of access points.

That is, in this implementation, the station may access a network through a single access point, and the access point may send the network accessing information to the controller, for the controller to send the network accessing information to another access point, so that the another access point may be connected to the station without performing an access process.

In a possible implementation, the plurality of access points further include a second access point; the first station accesses a network through the second access point; and the method further includes: receiving, by the first access point, network accessing information of the first station from the controller, where the network accessing information is received by the controller from the second access point.

That is, in this implementation, the controller may share, with another access point, network accessing information obtained by an access point when the station accesses a network, so that the another access point may be connected to the station without performing an access process.

In a possible implementation, the network accessing information includes association request information and a key.

That is, in this implementation, the network accessing information shared among the access points includes the association request information and the key, and each access point may establish a connection to the station based on the association request information and the key.

According to a third aspect, an embodiment of this application provides a data transmission apparatus, configured to control a plurality of access points. The apparatus includes: a communication unit, configured to receive a performance parameter sent by each of the access points, where the performance parameter indicates communication performance between the access point that sends the performance parameter and a first station; a first determining unit, configured to determine, based on each received performance parameter, an access point set configured to provide a data transmission service for the first station, where the access point set includes at least one of the plurality of access points; and a second determining unit, configured to determine, when the access point set includes at least two access points, a data transmission mode between each of the access points in the access point set and the first station based on the performance parameter sent by each of the access points in the access point set.

In a possible implementation, the performance parameter includes at least one of a received signal strength indication RSSI of a signal sent by the first station and received by the access point, and load information of the access point.

In a possible implementation, the performance parameter sent by any access point in the determined access point set satisfies that the RSSI is greater than a preset strength threshold, and the load information is less than a preset load threshold.

In a possible implementation, the apparatus is independent of each of the plurality of access points, or the apparatus is integrated into one of the plurality of access points.

In a possible implementation, when the apparatus is independent of each of the plurality of access points, the communication unit receives, over an optical link or a Wi-Fi channel, the performance parameter sent by each of the access points; or when the apparatus is integrated into one of the plurality of access points, the communication unit receives, over an optical link or a Wi-Fi channel, the performance parameter sent by each of the access points except the access point in which the apparatus is located.

In a possible implementation, the plurality of access points include a first access point and a second access point, and the first station accesses a network through the first access point; and the communication unit is further configured to: receive network accessing information of the first station from the first access point; and send the network accessing information to the second access point.

In a possible implementation, the network accessing information includes association request information and a key.

In a possible implementation, the plurality of access points include a same basic service set identifier BS SID.

In a possible implementation, the second determining unit is further configured to: determine, when the performance parameter corresponding to each of the access points in the access point set does not satisfy a preset performance requirement, that different access points in the access point set separately send same data to the first station at different moments.

In a possible implementation, the second determining unit is further configured to: determine, when the performance parameter corresponding to each of the access points in the access point set satisfies a preset performance requirement, that different access points in the access point set separately send different data to the first station at a same moment.

In a possible implementation, the second determining unit is further configured to: when a performance parameter of a third access point in the access point set satisfies a preset performance requirement, and access points in the access point set except the third access point do not satisfy the performance requirement, configure the third access point as a primary access point in the access point set, where the primary access point is configured to independently send data to the first station.

In a possible implementation, when receiving first data sent by the first station, the primary access point is further configured to send an acknowledge character corresponding to the first data to the first station.

In a possible implementation, the access point set includes a fourth access point and a fifth access point; and the second determining unit is further configured to: configure a sending moment at which the fourth access point sends uplink resource configuration information to the first station as a first moment; and configure a sending moment at which the fifth access point sends the uplink resource configuration information to the first station as a second moment, where the second moment is later than the first moment; and when the first station sends uplink data at the second moment in response to the uplink resource configuration information sent by the fourth access point, the fifth access point no longer sends the uplink resource configuration information to the first station.

It may be understood that, the data transmission apparatus provided in the third aspect is configured to perform the corresponding method provided in the first aspect. Therefore, for beneficial effects that can be achieved by the data transmission apparatus, refer to the beneficial effects of the corresponding method provided in the first aspect. Details are not described herein again.

According to a fourth aspect, an embodiment of this application provides a data transmission apparatus. The apparatus includes: a determining unit, configured to determine a first performance parameter, where the first performance parameter indicates communication performance between the apparatus and a first station; and a providing unit, configured to provide a data transmission service for the first station when the first performance parameter satisfies a preset performance requirement.

In a possible implementation, the apparatus further includes: a communication unit, configured to send network accessing information to a controller, where the network accessing information is information obtained by the apparatus when the first station accesses a network through the apparatus. The controller may send the network accessing information to a second access point controlled by the controller, so as to share the network accessing information among the access points controlled by the controller.

In a possible implementation, the first station accesses a network through a second access point; and the apparatus further includes: the communication unit, configured to receive network accessing information of the first station from the controller, where the network accessing information is received by the controller from the second access point.

In a possible implementation, the network accessing information includes association request information and a key.

It may be understood that, the data transmission apparatus provided in the fourth aspect is configured to perform the corresponding method provided in the second aspect. Therefore, for beneficial effects that can be achieved by the data transmission apparatus, refer to the beneficial effects of the corresponding method provided in the second aspect. Details are not described herein again.

According to a fifth aspect, an embodiment of this application provides a controller, including a processor, a memory, and a transceiver. The memory is configured to store computer instructions. When the controller runs, the processor executes the computer instructions, so that the controller performs the method provided in the first aspect.

According to a sixth aspect, an embodiment of this application provides an access point, including a processor, a memory, and a transceiver. The memory is configured to store computer instructions. When the access point runs, the processor executes the computer instructions, so that the access point performs the method provided in the second aspect.

According to a seventh aspect, an embodiment of this application provides a computer storage medium. The computer storage medium includes computer instructions. When the computer instructions are run on an electronic device, the electronic device performs the method provided in the first aspect.

According to an eighth aspect, an embodiment of this application provides a computer storage medium. The computer storage medium includes computer instructions. When the computer instructions are run on an electronic device, the electronic device performs the method provided in the second aspect.

According to a ninth aspect, an embodiment of this application provides a computer program product. When program code included in the computer program product is executed by a processor in an electronic device, the method provided in the first aspect is implemented.

According to a tenth aspect, an embodiment of this application provides a computer program product. When program code included in the computer program product is executed by a processor in an electronic device, the method provided in the second aspect is implemented.

According to an eleventh aspect, an embodiment of this application provides a chip system. The chip system includes a processor. The processor is configured to execute instructions, for a controller on which the chip system is installed to perform the method provided in the first aspect.

According to a twelfth aspect, an embodiment of this application provides a chip system. The chip system includes a processor. The processor is configured to execute instructions, for an access point on which the chip system is installed to perform the method provided in the second aspect.

According to a thirteenth aspect, an embodiment of this application provides an integrated circuit, including: a memory, configured to store instructions; and a processor coupled to the memory, configured to execute the instructions, to implement the method provided in the first aspect.

According to a fourteenth aspect, an embodiment of this application provides an integrated circuit, including: a memory, configured to store instructions; and a processor coupled to the memory, configured to execute the instructions, to implement the method provided in the second aspect.

According to the data transmission method and apparatus provided in embodiments of this application, based on a channel environment in which a station is located, one or more service access points may be selected for the station, and a data transmission mode between a plurality of service access points and the station may be selected, so that an optimal or optimal network access mode and an optimal or optimal data transmission mode are ensured for the station, thereby improving communication experience of users.

DESCRIPTION OF EMBODIMENTS

The following describes technical solutions in embodiments of the present invention with reference to accompanying drawings. It is clearly that the described embodiments are merely some rather than all of embodiments of this specification.

In the descriptions of this specification, "an embodiment", "some embodiments", or the like indicates that one or more embodiments of this specification include specific features, structures, or characteristics described with reference to the embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this specification, "a plurality of" means two or more than two.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. The terms "comprise", "include", "have", and their variants all mean "include but are not limited to", unless otherwise specifically emphasized in another manner.

A passive optical network (passive optical network, PON) is a technology that can provide fiber-optic communication services for home users. Generally, a PON includes an optical line terminal (optical line terminal, OLT) that serves as a network service provider endpoint and a plurality of optical network terminals (optical network terminals, ONTs) or optical network units (optical network units, ONUs) located on a user side. The OLT may be connected to a front-end (aggregation layer) switch by a network cable, and the OLT may be connected to an ONT (or an ONU) by an optical fiber. The OLT may be configured to perform conversion between an electrical signal and an optical signal, control and manage the ONT and ONU, and the like. The ONT or ONU may provide Wi-Fi network coverage.

Figure 1:
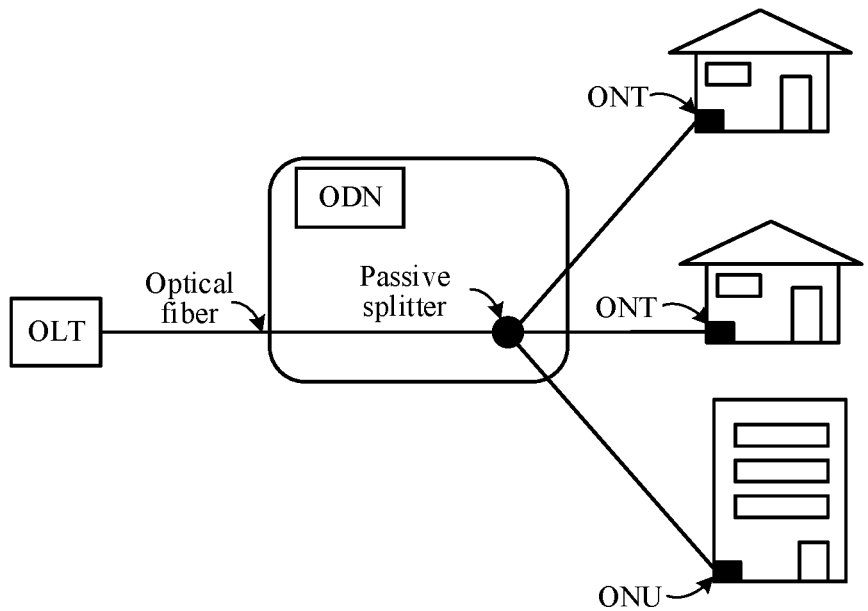
FIG. 1 is a schematic diagram of a fiber to the home network architecture.

FIG. 1 shows a fiber to the home (fiber to the home, FTTH) network architecture, which is a conventional application architecture of the PON. As shown in FIG. 1, in the FTTH network architecture, an OLT may be connected to a passive splitter (passive splitter) in an optical distribution network (optical distribution network, ODN) on a user side by an optical fiber. The OLT is connected to different ONTs or ONUs by different optical fibers through the passive splitter.

In the FTTH architecture, different ONTs or ONUs may provide Wi-Fi coverage for different homes. Based on the FTTH architecture, a fiber to the room (fiber to the room, FTTR) architecture is provided. In the FTTR architecture, one or more ONTs may be configured in a single room in a home, so that the one or more ONTs may provide a network service for the single room, so as to improve bandwidth, latency, and coverage of a Wi-Fi network. The ONT in the FTTR architecture may also be referred to as an edge ONT (edge ONT).

Figure 2:
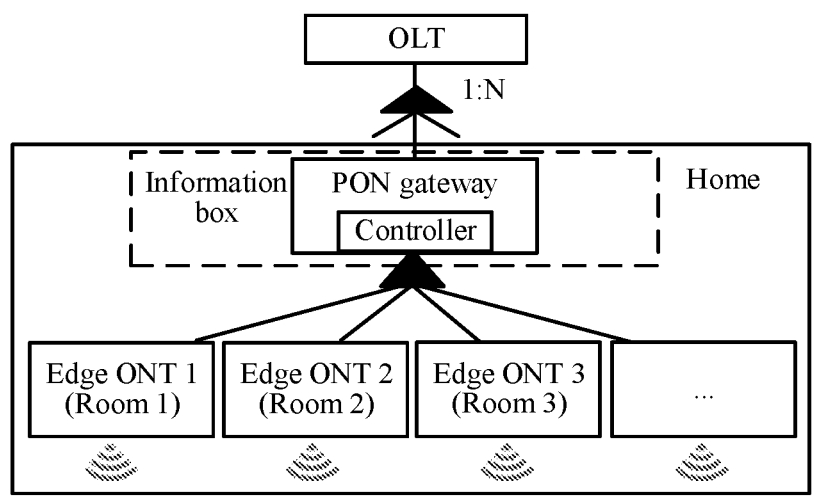
FIG. 2 is a schematic diagram of a fiber to the room network architecture.

FIG. 2 shows an FTTR network architecture. An OLT may be connected to a plurality of ONTs in a same home by an optical fiber through a splitter. As shown in FIG. 2, the plurality of ONTs may be deployed in different rooms in the home. For example, an ONT 1 is deployed in a room 1, an ONT 2 is deployed in a room 2, an ONT 3 is deployed in a room 3, and the like. A controller configured to control the plurality of ONTs may be provided. The controller may also be referred to as a mini OLT (mini OLT).

For example, the controller may be independent of the plurality of ONTs. Specifically, the controller may be independently provided, or may be integrated into a device other than the plurality of ONTs. For example, as shown in FIG. 2, the controller may be integrated into a PON gateway. In this example, the controller may be connected to each of the plurality of ONTs by an optical fiber.

For example, the controller may be integrated into one of the plurality of ONTs, for example, may be integrated into the ONT 1. In this example, the ONT in which the controller is located may be connected to another ONT by an optical fiber.

The ONT, the ONU, and the edge ONT may be devices carrying Wi-Fi chips, and may provide Wi-Fi network coverage for a station (station, STA). That is, the ONT, the ONU, and the edge ONT may serve as access points (access point, AP) for a terminal device to access a network. Therefore, in this embodiment of this application, the ONT, the ONU, and the edge ONT may be collectively referred to as access points.

Figure 3:
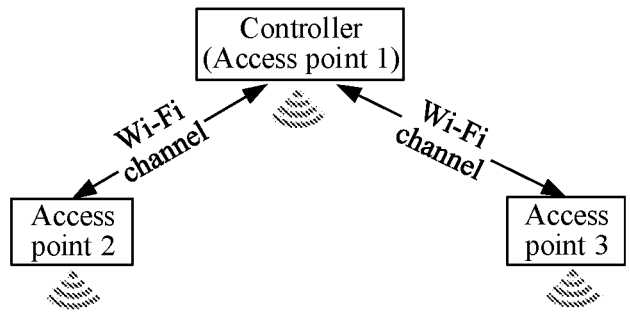
FIG. 3 is a schematic diagram of a Wi-Fi network architecture.

FIG. 3 shows a Wi-Fi network architecture. The network architecture may include a controller and a plurality of access points controlled by the controller. The plurality of access points may include an access point 1, an access point 2, an access point 3, and the like. Each access point may provide Wi-Fi network coverage. For example, the controller may be integrated into one of the plurality of access points, for example, integrated into the access point 1. In this example, the access point in which the controller is located may be connected to another access point by a Wi-Fi channel. For example, the controller may be independent of the plurality of access points, and may be connected to each of the plurality of access points by a Wi-Fi channel.

In a solution, different access points have different basic service set identifiers (basic service set identifiers, BSSIDs), and one station can be connected to only one access point at one moment. Therefore, if the solution is used in the network architecture shown in FIG. 2 or FIG. 3, each time a station needs to access an access point, the station and the access point need to undergo a complete station access process (including association, key agreement, and the like). In this case, when the station roams between different access points, a roaming switching time is long, causing service flow interruption, resulting in poor user experience. In addition, different terminal devices differ greatly. Some terminal devices may not support a Wi-Fi roaming protocol, and therefore, there is also a problem of non-roaming.

In another solution, a same basic service set identifier may be configured for all access points in networking. Each access point may broadcast a beacon (beacon) frame carrying a basic service set identifier. After receiving the beacon frame, the station may perceive that the basic service set identifier of the access points in the networking is unique. When the station needs to access a new access point, the access point originally accessed by the station sends information required for connection, such as a key of the station, to the new access point in advance, so that the station can seamlessly roam to the new access point (where a roaming switching time is at a millimeter level, and basically no packet loss is caused). Although this solution can achieve seamless roaming, data transmission efficiency is low. As the basic service set identifiers of all the access points in the networking are the same, uplink data sent by the station may be received by a plurality of access points in the networking, and when receiving the uplink data, the plurality of access points reply with an acknowledge character (acknowledge character, ACK) or a block ACK (block ack, BA), consequently causing an ACK or BA conflict on a station side. In addition, in this solution, wireless bandwidth is low, which is difficult to satisfy the requirement of high bandwidth of a home network.

In still another solution, a plurality of virtual access points (virtual access point, VAP) may be configured in an access point, and different access points have different basic service set identifiers. In other words, an access point may have a plurality of basic service set identifiers, and allocate one of the basic service set identifiers to a station. When a station moves to a coverage area of a new access point, the new access point may allocate a same basic service set identifier to the station, so that the station perceives that the basic service set identifier is unique, thereby achieving seamless roaming. In this solution, the access point needs to allocate different basic service set identifiers to different stations, which easily causes a conflict between the basic service set identifier and a basic service set identifier mask. In addition, the access point needs to broadcast beacon frames that carry different basic service set identifiers, resulting in high overheads of the beacon frames. Moreover, for an access point, a quantity of virtual access points that can be configured is limited, so that a quantity of stations connected to the access point is also limited.

An embodiment of this application provides a data transmission method, which may be applied to the network architecture shown in FIG. 2 or FIG. 3. A controller may select, based on communication performance between an access point and a station, one or more access points to cooperatively provide a data transmission service for the station; and when the one or more access points cooperatively provide the data transmission service for the station, the controller may select a data transmission mode between the one or more access points and the station. In this way, based on a channel environment between the access point and the station, an access point accessed by the station may be flexibly selected, and a data transmission mode between the access point and the station may be selected, so that an optimal wireless network access mode and an optimal data transmission mode are ensured for the station, thereby improving communication experience of users.

The access point may be a communication device that supports one or more standards of 802.11ax, 802.11ac, 802.11n, 802.11g, 802.11b, 802.11a, and the like. For example, the access point may be the ONT or the ONU shown in FIG. 1 or FIG. 2, or may be the access point shown in FIG. 3.

The station may be a terminal device such as a mobile phone, a notebook computer, a tablet computer, a wearable intelligent device, or an intelligent household appliance.

The following describes a data transmission method provided in embodiments of this application by using examples in different embodiments.

Figure 4:
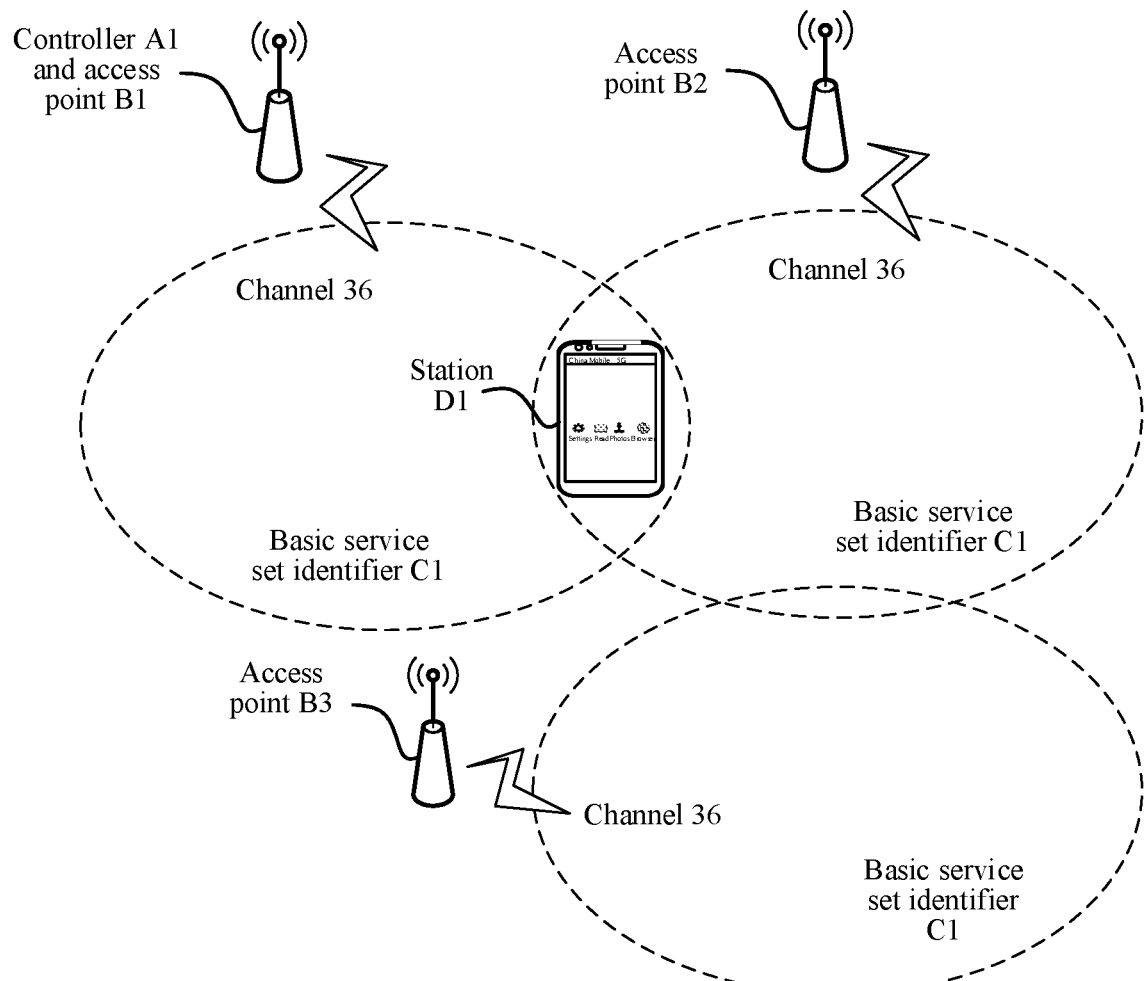
FIG. 4 is a network logical architecture according to an embodiment of this application.

FIG. 4 shows a network logical architecture according to an embodiment of this application. The logical architecture may be provided in the network architecture shown in FIG. 2 or FIG. 3. In the logical architecture, a controller A1 may control a plurality of access points including an access point B1, an access point B2, and an access point B3, and the like. The controller A1 may be integrated into the access point B1. The controller A1 may be separately connected to access points other than the access point B1, such as the access point B2 and the access point B3, by an optical fiber.

A plurality of access points such as the access point B1, the access point B2, and the access point B3 may have a same basic service set identifier C1. The same basic service set identifier may be manually configured, or may be automatically configured by the controller A1.

The controller A1 may control the access point B1, the access point B2, and the access point B3 to select a same Wi-Fi channel (for example, a channel 36) as a fronthaul (fronthaul) channel, so as to subsequently provide a data transmission service for a same station in a cooperative manner.

A station in coverage of an access point may access a network through the access point. For example, a station D1 may access a network through the access point B1. That a station accesses a network means that a Wi-Fi link is established between the station and an access point, and data is exchanged through the Wi-Fi link, so that the station can access a network such as the Internet through the access point. Generally, for a Wi-Fi network, a process of network accessing of a station includes the following steps.

S1. A station sends probe request (probe request) information to an access point.

S2. The access point returns probe response (probe response) information to the station.

S3. The station sends authentication request (authentication request) information to the access point.

S4. The access point returns authentication response (authentication response) information to the station.

S5. The station sends association request (association request) information to the access point. The association request information may also be referred to as an association request frame, and is necessary information for the access point to establish a connection to the station. The association request information includes capability information of the station (for example, a communication protocol supported by the station), so that the access point communicates with the station in a communication manner that satisfies a capability of the station.

S6. The access point returns association response (association response) information to the station.

Then, key agreement may be performed between the access point and the station, to generate a key for communication between the access point and the station.

For a specific process of network accessing of the station, refer to descriptions of existing Wi-Fi related protocols. Details are not described herein again.

As described above, the plurality of access points such as the access point B1, the access point B2, and the access point B3 have the same basic service set identifier, and the association request information sent by the station when accessing a network may be received by the plurality of access points. Therefore, the plurality of access points may send the association response information to the station, causing a conflict and affecting the station to access the network.

In some embodiments, to avoid the foregoing problem, each access point that receives the association request information sends, to the controller A1, the association request information received by each access point and a performance parameter that indicates communication performance between each access point and the station D1. The controller A1 may determine, based on the performance parameter sent by each access point, an access point configured to respond to the association request information. Details are as follows.

In an illustrative example, the performance parameter sent by an access point to the controller A1 may include load information of the access point. It may be understood that the load information may indicate a busy degree of the Wi-Fi channel of the access point B1. A higher load indicates that the Wi-Fi channel is busier and the communication performance is lower. A lower load indicates that the Wi-Fi channel is idler and the communication performance is higher. For example, the load information may be a quantity of stations connected to the access point. For example, the load information may include a quantity and types of stations connected to the access point. Different station types correspond to different load weights. A correspondence between a station type and a load weight may be preset. For example, a load weight corresponding to a station type of a mobile phone is 1, a load weight corresponding to a station type of a VR device is 2, and a load weight corresponding to a station type of a smart refrigerator is 0.2. Therefore, the controller A1 may determine a load of the access point based on the load information of the access point. For example, when the load information is a quantity of stations, a larger quantity of stations indicates a larger load of the access point. For example, when the load information includes a quantity and types of stations, a quantity of stations of a same type may be multiplied by a load weight corresponding to the type, to obtain a weighted load. Then, weighted loads of all station types are added to obtain a sum for indicating the load of the access point.

In this illustrative example, the controller A1 may select, based on the load of each access point, an access point configured to respond to the association request information. For example, the controller A1 may receive association request information sent by the access point B1 and load information of the access point B1, and may receive association request information sent by the access point B2 and load information of the access point B2. Then, the controller A1 determines whether the association request information sent by the access point B1 and the association request information sent by the access point B2 are from a same station; determines a load of the access point B1 based on the load information sent by the access point B1; and determines a load of the access point B2 based on the load information sent by the access point B2. If the association request information sent by the access point B1 and the association request information sent by the access point B2 are from the same station (for example, the association request information sent by the access point B1 and the association request information sent by the access point B2 to the controller A1 are both association request information sent by the station D1 and received by the access point B1 and the access point B2 respectively), and the load of the access point B1 is lower than the load of the access point B2, the controller A1 may determine that the access point B1 is an access point configured to respond to the association request information.

In an illustrative example, the performance parameter sent by an access point to the controller A1 may include a received signal strength indication (received signal strength indication, RSSI) of a Wi-Fi signal sent by the station D1 and received by the access point. Specifically, the access point may measure the Wi-Fi signal sent by the station D1 and received by the access point, to obtain the RSSI. It may be understood that the RSSI may reflect communication performance of a channel or a link. A higher RSSI indicates higher communication performance.

In this illustrative example, the controller A1 may select, based on the RSSI of the Wi-Fi signal sent by the station D1 and received by the access point, an access point configured to respond to the association request information. For example, the controller A1 may receive association request information sent by the access point B1 and an RSSI of a Wi-Fi signal sent by the station D1 and received by the access point B1, and may receive association request information sent by the access point B2 and an RSSI of a Wi-Fi signal sent by the station D1 and received by the access point B2. Then, the controller A1 determines whether the association request information sent by the access point B1 and the association request information sent by the access point B2 are from a same station; and determines whether the RSSI of the Wi-Fi signal sent by the station D1 and received by the access point B1 is greater than the RSSI of the Wi-Fi signal sent by the station D1 and received by the access point B2. If the association request information sent by the access point B1 and the association request information sent by the access point B2 are from the same station, and the RSSI of the Wi-Fi signal sent by the station D1 and received by the access point B1 is greater than the RSSI of the Wi-Fi signal sent by the station D1 and received by the access point B2, the controller A1 may determine that the access point B1 is an access point configured to respond to the association request information.

In an illustrative example, the performance parameter sent by an access point to the controller A1 may include load information of the access point and an RSSI of a Wi-Fi signal sent by the station D1 and received by the access point. The controller A1 may determine, by comprehensively considering the load information of the access point and the RSSI of the Wi-Fi signal sent by the station D1 and received by the access point, the access point configured to respond to the association request information. In an example, at least one access point that receives a Wi-Fi signal, sent by the station D1, whose RSSI is greater than a preset strength threshold may be determined, and then an access point with a minimum load in the at least one access point is determined as the access point configured to respond to the association request information. In an example, one or more access points whose loads are lower than a preset load threshold may be determined, and then an access point that is in the one or more access points and that receives a Wi-Fi signal, sent by the station D1, with a maximum RSSI is determined as the access point configured to respond to the association request information. It may be set that, through the foregoing solution, the controller A1 may determine that the access point B1 is the access point configured to respond to the association request information.

In this way, through the foregoing solution, an access point (the access point B1) configured to respond to the association request information can be determined. The access point (the access point B1) configured to respond to the association request information sends association response information to the station D1, and another access point does not send association response information to the station D1, so that the station D1 can access a network through a single point, thereby avoiding an access conflict caused by a same BSSID of a plurality of access points. After the station D1 accesses a network through the access point B1, the access point B1 may send network accessing information of the station D1 to the controller A1. The controller A1 may send the network accessing information to each access point controlled by the controller A1, so that the access points share the network accessing information. The network accessing information refers to information required for establishing a Wi-Fi link, and is cooperatively generated by the station and the access point when the station accesses a network. When the station accesses a network, the access point may obtain the network accessing information. For example, the network accessing information includes association request information and a key. The association request information is specifically association request information sent by the station to the access point in a network accessing process, and the key is a key on which the station and the access point agree in the network accessing process.

In this way, a plurality of access points controlled by the controller A1 may obtain the network accessing information of the station D1, so that a Wi-Fi link connected to the station D1 can be established when a specific condition is satisfied. For example, each access point may obtain a performance parameter that indicates communication performance between the access point and the station D1, and determine whether the performance parameter satisfies a preset performance requirement E1. When the performance parameter satisfies the preset performance requirement E1, the access point may establish a Wi-Fi link connected to the station D1, so as to provide a data transmission service for the station D1.

Figure 5:
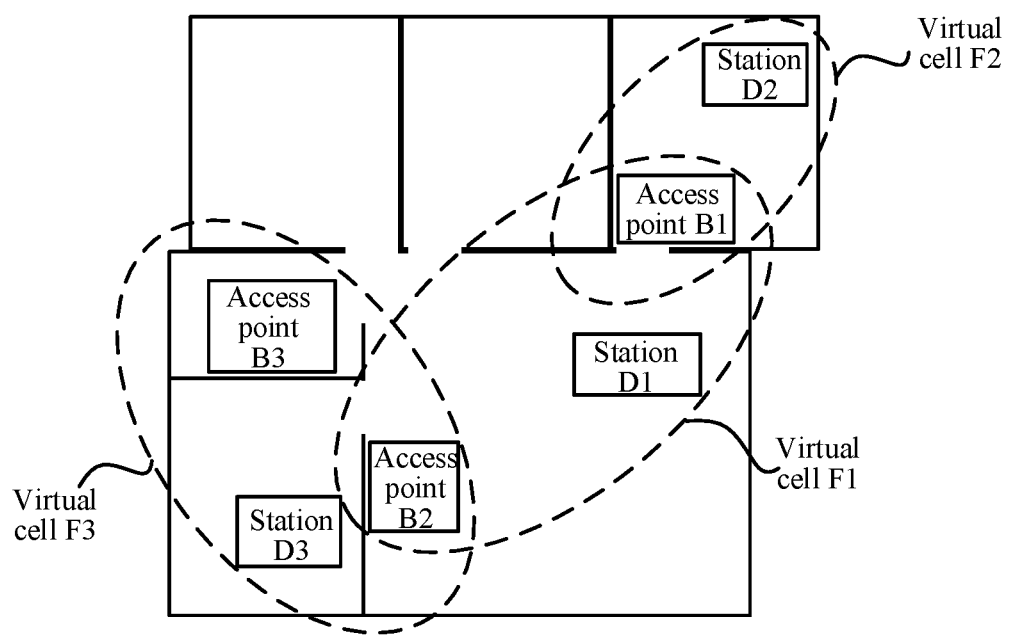
FIG. 5 is a schematic diagram of a virtual cell according to an embodiment of this application.

Each access point may send, to the controller A1, the performance parameter that indicates communication performance between the access point and the station D1. When the controller A1 determines that the performance parameter satisfies the preset performance requirement E1, the controller A1 may determine the access point that sends the performance parameter to provide a data transmission service for the station D1. In this way, the controller A1 may determine, from a plurality of access points controlled by the controller A1, one or more access points configured to provide a data transmission service for the station D1. The one or more access points may form an access point set, to cooperatively provide a data transmission service for the station D1 under control of the controller A1. The access points in the access point set jointly provide Wi-Fi network coverage for the station D1. For ease of description, the Wi-Fi network coverage that is provided by the access points in the access point set jointly for the station D1 may be referred to as a virtual cell. For example, as shown in FIG. 5, virtual cells of different stations may be determined in the foregoing manner. An access point B1 and an access point B2 may jointly provide a virtual cell F1 for a station D1. The access point B1 may provide a virtual cell F2 for a station D2. The access point B2 and an access point B3 may jointly provide a virtual cell F3 for a station D3.

The following describes a performance parameter in embodiments of this application by using the access point B1 and the station D1 as an example.

As described above, the performance parameter sent by the access point B1 to the controller A1 may indicate the communication performance between the access point B1 and the station D1. That is, the performance parameter may include an indicator that indicates communication performance of a Wi-Fi link.

In some embodiments, the performance parameter may include an RSSI of a Wi-Fi signal sent by the station D1 and received by the access point B1. Correspondingly, the performance requirement E1 includes a preset strength threshold G1. That the performance parameter satisfies the performance requirement E1 includes that the RSSI is greater than the strength threshold G1.

In some embodiments, the performance parameter sent by the access point B1 to the controller may include load information of the access point B1. As described above, the load information may be a quantity of stations connected to the access point B1, or may be a quantity and types of stations connected to the access point B1. For details, refer to the foregoing descriptions. Details are not described herein again. Correspondingly, the performance requirement E1 includes a preset load threshold H1. That the performance parameter satisfies the performance requirement E1 includes that the load information (or a load determined based on the load information) is less than the load threshold H1.

In some embodiments, the performance parameter may include both the RSSI and the load information. The performance requirement E1 includes both the strength threshold G1 and the load threshold H1. That the performance parameter satisfies the performance requirement E1 includes both that the RSSI is greater than the strength threshold G1 and that the load information (or a load determined based on the load information) is less than the load threshold H1.

In some embodiments, the performance parameter sent by the access point B1 to the controller may include a service type of a service executed by the station D1. It may be understood that different service types have different requirements on communication performance of a channel. It may be understood that, a high-demand service that requires low latency and high bandwidth, such as a VR service or a voice service, has a high requirement on communication performance of a channel. When a service type, included in the performance parameter, of a service that is executed by the station D1 is a high-demand service, the controller A1 may continue to perform the data transmission method provided in embodiments of this application, which is determining an access point set configured to jointly provide a data transmission service for the station D1. It may be understood that, a low-demand service such as a background (background, BK) service or a best effort (best effort, BE) service has a low requirement on communication. When a service type, included in the performance parameter, of a service that is executed by the station D1 is a low-demand service, the controller A1 may stop performing the data transmission method provided in embodiments of this application, and directly indicate an access point (for example, the access point B1) to provide a data transmission service for the station D1.

In some embodiments, each access point may periodically (for example, at one-second intervals or at other preset intervals) send a recently obtained performance parameter to the controller A1, or each access point may send a currently obtained performance parameter to the controller A1 in real time. The controller A1 may update, based on a performance parameter that is recently received by the controller A1 and that is sent by each access point, the access point set configured to provide a data transmission service for the station, for the station to access a network in an optimal or optimal manner at different moments.

In the foregoing manner, the controller A1 may determine the access point set configured to provide a data transmission service for the station D1.

The controller A1 may further determine a data transmission mode between each access point and the station D1 based on a performance parameter sent by each access point in the access point set. The following description is made by using an example.

Figure 6:
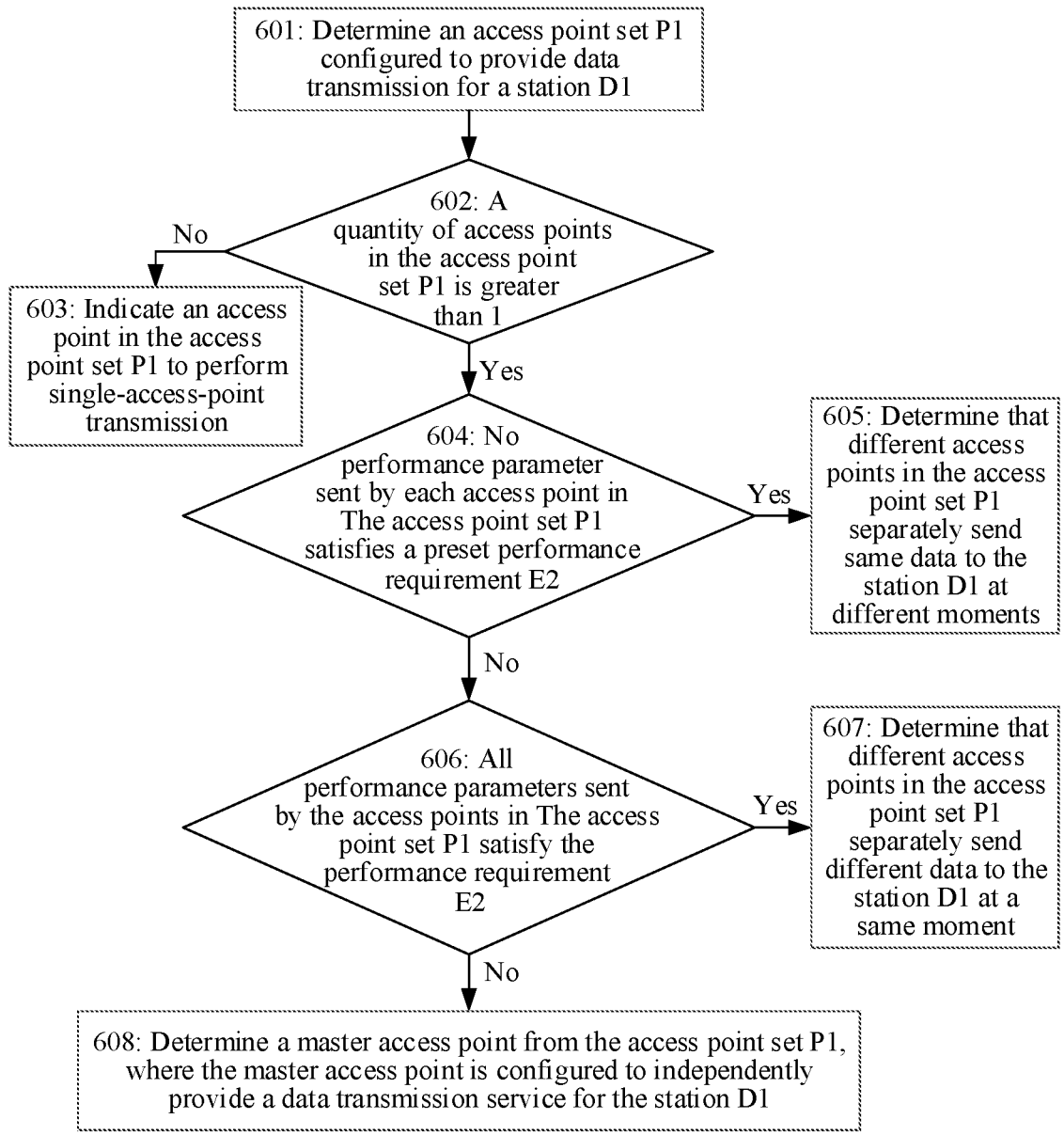
FIG. 6 is a flowchart of a data transmission method according to an embodiment of this application.

Refer to FIG. 6. The controller A1 may perform step 601 to determine an access point set P1 configured to provide a data transmission service for the station D1. For details, refer to the foregoing descriptions. Details are not described herein again.

When or after the access point set P1 is determined, the controller A1 may perform step 602 to determine whether a quantity of access points in the access point set P1 is greater than 1.

If the quantity of access points in the access point set P1 is not greater than 1, the controller A1 may perform step 603 to indicate an access point in the access point set P1 to perform single-access-point transmission. For single-access-point transmission, refer to descriptions in a conventional technology. Details are not described herein again.

In some embodiments, if the quantity of access points in the access point set P1 is greater than 1, the controller A1 may perform step 604 to determine whether all performance parameters sent by the access points in the access point set P1 fail to satisfy a preset performance requirement E2. In other words, it is determined that no performance parameter sent by each access point satisfies the performance requirement E2. The performance requirement E2 is higher than the performance requirement E1. In other words, the performance requirement E2 is stricter than the performance requirement E1.

For example, as described above, the performance parameter sent by each access point may include an RSSI. Correspondingly, the performance requirement E2 may include a preset strength threshold G2, and the strength threshold G2 is higher than the strength threshold G1. That no performance parameter sent by each access point in the access point set P1 satisfies the preset performance requirement E2 may specifically mean that an RSSI of each access point is less than the strength threshold G2.

For example, as described above, the performance parameter sent by each access point may include load information. Correspondingly, the performance requirement E2 may include a preset load threshold H2, and the load threshold H2 is less than the load threshold H1. That no performance parameter sent by each access point in the access point set P1 satisfies the preset performance requirement E2 may specifically mean that load information (or a load determined based on the load information) of each access point is greater than the load threshold H2.

For example, as described above, the performance parameter sent by each access point may include an RSSI and load information. Correspondingly, the performance requirement E2 may include a preset strength threshold G2 and a preset load threshold H2, the strength threshold G2 is greater than the strength threshold G1, and the load threshold H2 is less than the load threshold H1. That no performance parameter sent by each access point in the access point set P1 satisfies the preset performance requirement E2 may specifically mean that an RSSI of each access point is less than the strength threshold G2, and/or load information (or a load determined based on the load information) of each access point is greater than the load threshold H2.

In a case that all performance parameters sent by the access points in the access point set P1 fail to satisfy the performance requirement E2, in other words, when no performance parameter of each access point in the access point set P1 satisfies the performance requirement E2, the controller A1 may perform step 605 to determine that different access points in the access point set P1 separately send same data to the station D1 at different moments.

For example, the controller A1 or another network-side device (for example, a gateway) may send downlink data Q1 whose destination is the station D1 to each access point in the access point set P1. The controller A1 configures a sending moment at which each access point sends the downlink data Q1 to the station D1. Different access points have different sending moments.

For example, the controller A1 may send the downlink data Q1 whose destination is the station D1 to different access points in the access point set P1 at different moments. When receiving the downlink data Q1, each access point may send the downlink data Q1 to the station D1. In this way, different access points send the same data to the station D1 at different moments, so that when a network environment of the station D1 is poor, accuracy of receiving downlink data by the station D1 can be ensured.

In some embodiments, when the quantity of access points in the access point set P1 is greater than 1, the controller A1 may perform step 606 to determine whether all performance parameters sent by the access points in the access point set P1 satisfy the performance requirement E2. For example, as shown in FIG. 6, step 606 may be performed after step 604. Specifically, when not all performance parameters sent by the access points in the access point set P1 fail to satisfy the performance requirement E2, the controller A1 may perform step 606. For example, as described above, the performance parameter sent by each access point may include an RSSI. Correspondingly, the performance requirement E2 may include a preset strength threshold G2, and the strength threshold G2 is higher than the strength threshold G1. That all performance parameters sent by the access points in the access point set P1 satisfy the preset performance requirement E2 may specifically mean that an RSSI of each access point is not less than the strength threshold G2.

For example, as described above, the performance parameter sent by each access point may include load information. Correspondingly, the performance requirement E2 may include a preset load threshold H2, and the load threshold H2 is less than the load threshold H1. That all performance parameters sent by the access points in the access point set P1 satisfy the preset performance requirement E2 may specifically mean that load information (or a load determined based on the load information) of each access point is not greater than the load threshold H2.

For example, as described above, the performance parameter sent by each access point may include an RSSI and load information. Correspondingly, the performance requirement E2 may include a preset strength threshold G2 and a preset load threshold H2, the strength threshold G2 is greater than the strength threshold G1, and the load threshold H2 is less than the load threshold H1. That all performance parameters sent by the access points in the access point set P1 satisfy the preset performance requirement E2 may specifically mean that an RSSI of each access point is not less than the strength threshold G2, and load information (or a load determined based on the load information) of each access point is not greater than the load threshold H2.

When all performance parameters sent by the access points in the access point set P1 satisfy the performance requirement E2, the controller A1 may perform step 607 to determine that different access points in the access point set P1 separately send different data to the station D1 at a same moment.

For example, an access point in the access point set P1 may send downlink data to the station D1 in a distributed multiple-input multiple-output (multiple-input multiple-output, MIMO) manner. Specifically, the controller A1 may notify each access point in the access point set P1 to perform slot synchronization. Slot synchronization may be understood as clock synchronization. After slot synchronization, the access points in the access point set P1 may use a same clock. The controller A1 may further notify each access point in the access point P1 to perform channel sounding. The access point B1 is used as an example. The access point B1 may send a channel sounding signal (for example, a null data packet (null data packet, NDP)) to the station D1. The station D1 may send a channel sounding result (for example, a feedback null data packet (feedback NDP)) to the access point B1 in response to the channel sounding signal. The access point B1 may report the channel sounding result to the controller A1. Each access point in the access point set P1 may report a channel sounding result to the controller A1. The controller A1 may determine, based on the channel sounding result reported by each access point, a precoding matrix for performing distributed MIMO. The precoding matrix may include a precoding vector (vector) corresponding to each access point. The controller A1 may separately deliver the precoding vector to the corresponding access point. Then, the access points may send different downlink data to the station by using the precoding vectors of the access points, so as to implement multi-channel concurrency.

The foregoing merely describes the solution of distributed MIMO as an example. For a detailed solution, refer to the 802.11 be protocol. Details are not described herein again.

In some embodiments, when determining results of both step 604 and step 606 are no, that is, when performance parameters sent by some access points in the access point set P1 satisfy the performance requirement E2, and performance parameters sent by the other access points do not satisfy the performance requirement E2, the controller A1 may perform step 608 to determine a primary access point from the access point set P1, where the primary access point is configured to independently provide a data transmission service for the station D1. Specifically, the controller A1 may use an access point whose sent performance parameter satisfies the performance requirement E2 as a primary access point, and control the primary access point to provide a data transmission service for the station D1, and the other access points no longer provide a data transmission service for the station D1. For example, when there are a plurality of access points whose sent performance parameters satisfy the performance requirement E2, one of the access points may be determined as a primary access point. For example, an access point with a minimum load or a maximum RSSI may be determined as the primary access point.

In an illustrative example of these embodiments, the data transmission service in step 608 may specifically refer to a downlink data transmission service. That is, the controller A1 controls the primary access point to send downlink data received from a network side to the station D1, and the other access points no longer send downlink data to the station D1.

In another illustrative example of these embodiments, the data transmission service in step 608 may include an uplink data transmission service and a downlink data transmission service. That is, the controller A1 indicates the primary access point to provide an uplink data transmission service and a downlink data transmission service for the station D1. The other access points no longer receive or process uplink data sent by the station D1, and no longer send downlink data to the station D1.

According to the foregoing solution, when the network environment of the station D1 is poor (all performance parameters sent by the access points in the access point set P1 fail to satisfy the performance requirement E2), different access points may separately send same data to the station D1, so that a probability that the station D1 receives downlink data can be increased. Alternatively, when the network environment of the station D1 is good (all performance parameters sent by the access points in the access point set P1 satisfy the performance requirement E2), different access points may simultaneously send different data to the station D1, so that a data throughput is increased. Alternatively, when the network environment of the station D1 is average (performance parameters sent by some access points in the access point set P1 satisfy the performance requirement E2, and performance parameters sent by the other access points do not satisfy the performance requirement E2), an access point with good communication performance with the station D1 may be indicated to provide a data transmission service for the station. Therefore, an optimal network access mode and an optimal data transmission mode can be provided for the station D1, thereby improving communication experience of users.

The following describes, in a specific example, the data transmission method provided in embodiments of this application.

Figure 7A:
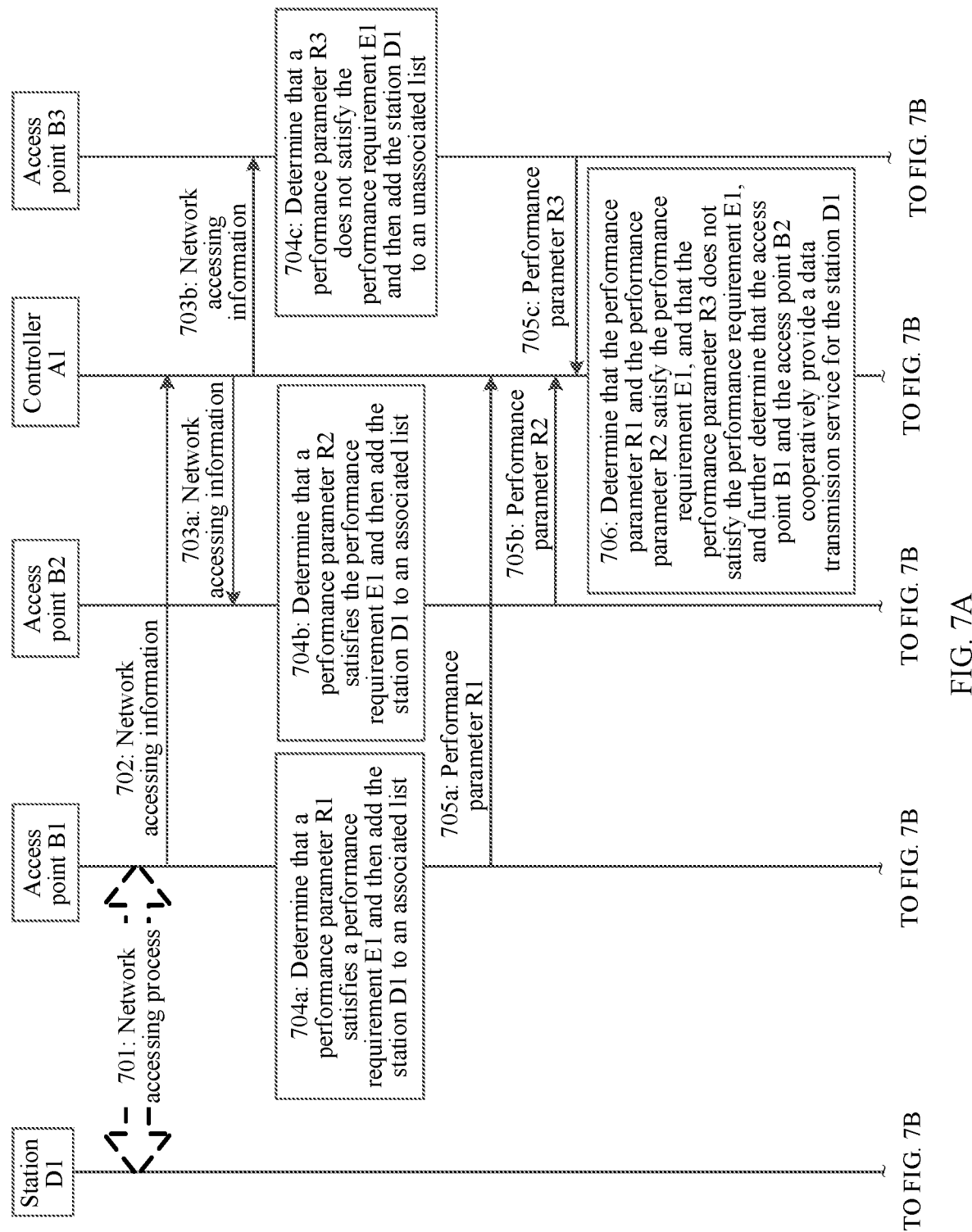
FIG. 7A and FIG. 7B are a flowchart of a data transmission method according to an embodiment of this application.
Figure 7B:
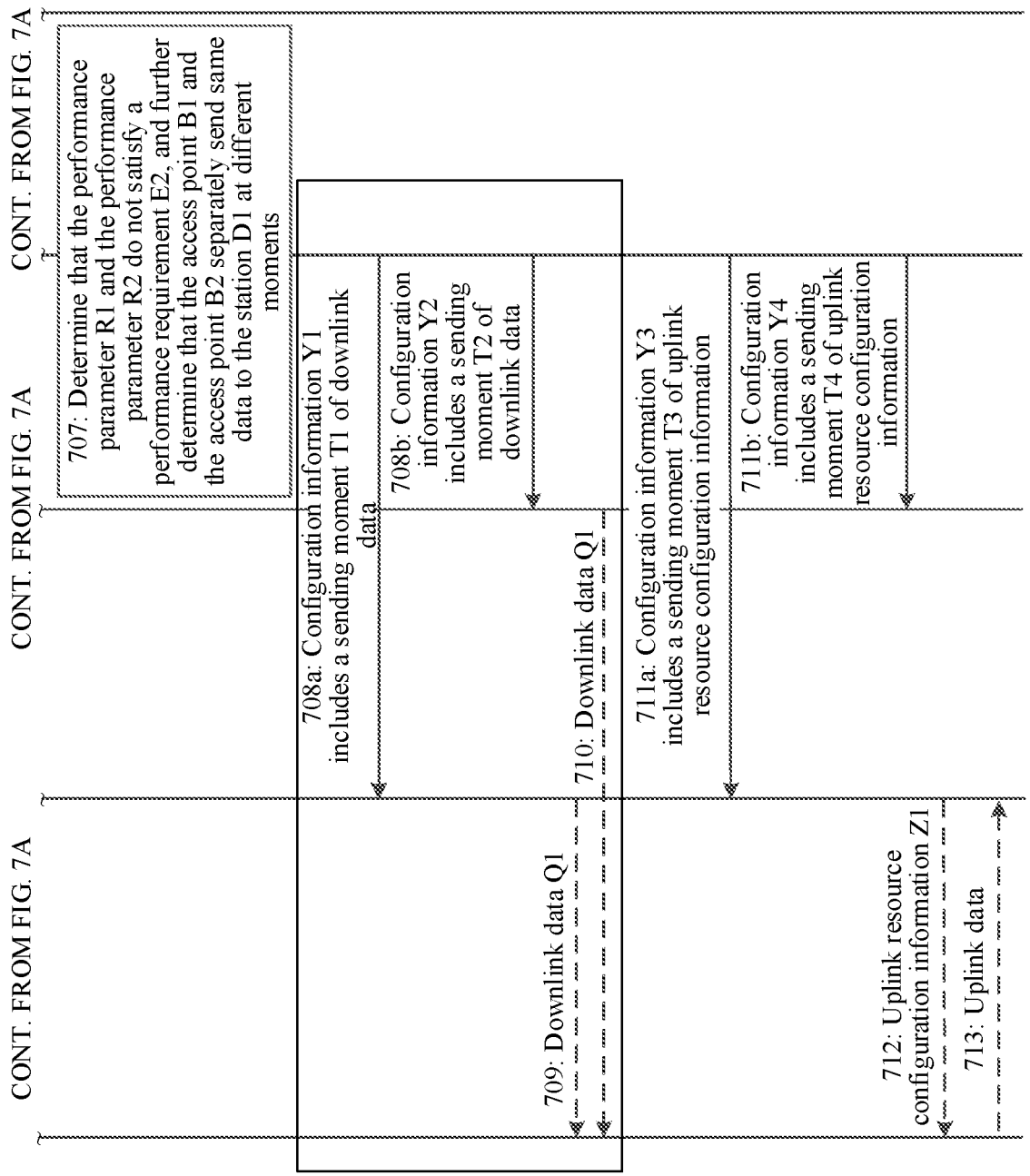

FIG. 7A and FIG. 7B show a data transmission method according to an embodiment of this application. The method may be applied to a scenario in which a channel environment of a station is poor.

As shown in FIG. 7A and FIG. 7B, a station D1 and an access point B1 may perform a network accessing process or procedure of the station D1, so that the station D1 can access a network through the access point B1. For a specific network accessing process, refer to the foregoing description of steps S1 to S6. Details are not described herein again.

After the station D1 accesses a network through the access point B1, the access point B1 may perform step 702 to send, to a controller A1, network accessing information obtained by the access point B1 when the station D1 accesses the network. For details about the network accessing information, refer to the foregoing descriptions. Details are not described herein again.

The controller A1 may send the introduced network accessing information to an access point B2 through step 703a, and send the network accessing information to an access point B3 through step 703b.

In some embodiments, the access point B1 may obtain a performance parameter R1 that indicates communication performance between the access point B1 and the station D1, and perform step 704a to determine that the performance parameter R1 satisfies a performance requirement E1 and then add the station D1 to an associated list of the access point B1. For details about the performance parameter and the performance requirement E1, refer to the foregoing description. A station in the associated list is a station connected to the access point B1. That is, a Wi-Fi link is established between a station in the associated list and the access point B1.

In some embodiments, the access point B2 may obtain a performance parameter R2 that indicates communication performance between the access point B2 and the station D1, and perform step 704b to determine that the performance parameter R2 satisfies a performance requirement E1 and then add the station D1 to an associated list of the access point B2. In step 704b, when or after determining that the performance parameter R2 satisfies the performance requirement E1, the access point B2 may establish a Wi-Fi link between the access point B2 and the station D1 based on the network accessing information received from the controller A1.

In some embodiments, the access point B3 may obtain a performance parameter R3 that indicates communication performance between the access point B3 and the station D1, and perform step 704c to determine that the performance parameter R3 does not satisfy a performance requirement E1 and then add the station D1 to an unassociated list of the access point B3. A station in the unassociated list is a station that is not connected to the access point B3.

The access point B1 may perform step 705a to send the performance parameter R1 to the controller A1. The access point B2 may perform step 705b to send the performance parameter R2 to the controller A1. The access point B3 may perform step 705c to send the performance parameter R3 to the controller A1. Then, the controller A1 may determine, based on the performance parameter R1, the performance parameter R2, and the performance parameter R3, an access point set P1 configured to provide a data transmission service for the station D1. Specifically, the controller A1 may perform step 706 to determine that the performance parameter R1 and the performance parameter R2 satisfy the performance requirement E1, and to determine that the performance parameter R3 does not satisfy the performance requirement E1, and further determine that the access point B1 and the access point B2 cooperatively provide a data transmission service for the station D1. That is, when the performance parameter R1 and the performance parameter R2 satisfy the performance requirement E1, but the performance parameter R3 does not satisfy the performance requirement E1, the access point B1 and the access point B2 form an access point set P1 configured to provide a data transmission service for the station D1, and the access point B3 is not included in the access point set P1.

Still refer to FIG. 7B. The controller A1 may perform step 707 to determine that the performance parameter R1 and the performance parameter R2 do not satisfy a performance requirement E2, and further determine that the access point B1 and the access point B2 send same data to the station D1 at different moments. The data transmission mode in which different access points separately send same data to the station at different moments may be referred to as a data backup transmission mode. The performance parameter R1 and the performance parameter R2 do not satisfy the performance requirement E2, indicating that a channel environment in which the station D1 is located is poor. To avoid loss or retransmission of a large amount of data packets, the controller A1 selects the data backup transmission mode.

In some embodiments, when or after determining that the access point B1 and the access point B2 send the same data to the station D1 at different moments, the controller A1 may perform step 708a and step 708b. Specifically, in step 708a, configuration information Y1 is sent to the access point B1. The configuration information Y1 may include a sending moment T1 of downlink data. The configuration information Y1 may indicate the access point B1 to send downlink data Q1 to the station D1 at the sending moment T1. The access point B1 may perform step 709 at the moment T1 in response to the configuration information Y1, to send the downlink data Q1 to the station D1. The downlink data Q1 is received by the access point B1 from a network-side device (for example, a gateway or the controller A1). In step 708b, configuration information Y2 is sent to the access point B2. The configuration information Y2 includes a sending moment T2 of downlink data. The configuration information Y2 may indicate the access point B2 to send downlink data Q1 to the station D1 at the sending moment T2. The downlink data Q1 is received by the access point B2 from a network-side device (for example, a gateway or the controller A1). Therefore, when the downlink data Q1 is successfully transmitted on at least one channel, the station D1 can successfully receive the downlink data Q1.

Steps 707 to 710 describe a solution of downlink data transmission. The data transmission method provided in this embodiment of this application may further include a solution of uplink data transmission. Details are as follows.

In some embodiments, still refer to FIG. 7B. After step 706, the controller A1 may perform step 711a to send configuration information Y3 to the access point B1, where the configuration information Y3 includes a sending moment T3 of uplink resource configuration information. The controller A1 may further perform step 711b to send configuration information Y4 to the access point B1, where the configuration information Y4 includes a sending moment T4 of uplink resource configuration information. The moment T4 is later than the moment T3.

The configuration information Y3 may indicate the access point B1 to send uplink resource configuration information Z1 to the station D1 at the sending moment T3. The access point B1 may perform step 712 in response to the configuration information Y3, to send the uplink resource configuration information Z1 to the station D1. It may be understood that the uplink resource configuration information indicates a frequency domain resource and a time domain resource that are used by the station to send uplink data. For example, the configuration information Y3 may further indicate that a delay resource for uplink transmission allocated by the access point B1 to the station D1 is the moment T4. In other words, the uplink resource configuration information Z1 may indicate the station D1 to send an uplink transmission resource at the moment T4. If successfully receiving the uplink resource configuration information Z1, the station D1 may perform step 713 to send uplink data to the access point B1 at the moment T4.

The configuration information Y4 may indicate the access point B2 to send uplink resource configuration information to the station D1 at the sending moment T4. The configuration information Y4 may indicate that the access point B2 no longer sends the uplink resource configuration information to the station D1 when the station sends the uplink data at the sending moment T4. Back to FIG. 4, the access point B2 and the access point B1 communicate with the station D1 on a same channel (for example, a channel 36). When the access point B2 sends the uplink resource configuration information to the station D1 at the moment T4, it is detected that an air interface or a Wi-Fi channel of the station D1 is occupied, indicating that the station D1 is sending uplink data. In this case, the access point B2 no longer sends the uplink resource configuration information to the station D1. For example, that the access point B2 no longer sends the uplink resource configuration information to the station D1 specifically means that the access point B2 no longer sends the uplink resource configuration information to the station D1 until receiving configuration information that is delivered by the controller A1 next time and that indicates sending of an uplink resource.

In addition, it may be understood that the uplink data sent in step 713 is transmitted by using an uplink transmission resource configured by the access point B1. The access point B1 receives and processes the uplink data, and replies with an acknowledge character (ACK or BA) for the uplink data. However, the access point B2 no longer processes the uplink data, and does not reply with an acknowledge character (ACK or BA) for the uplink data. Therefore, a conflict caused when a plurality of access points send acknowledge characters is avoided.

In some embodiments, the uplink resource configuration information described above may be specifically a trigger (trigger) frame in the 802.11ax protocol. The uplink data sent in step 713 may be specifically carried in a trigger-based physical-layer protocol data unit (trigger-based physical-layer protocol data unit, TB PPDU).

It is to be noted that although step 701 to step 713 are shown in a sequence in FIG. 7A and FIG. 7B, an execution sequence of these steps is not limited. In some embodiments, step 701 to step 713 may be performed according to the sequence shown in FIG. 7A and FIG. 7B. In some embodiments, step 701 to step 713 may be performed in another sequence. For example, steps 708a, 708b, 711a, and 711b may be performed in parallel. In another example, step 712 may be performed before step 709, and the like, this is not listed herein one by one.

In the data transmission method provided in this embodiment of this application, when a channel environment in which the station is located is poor, the plurality of access points may send the same data to the station, thereby increasing a probability that the station successfully receives the data.

Figure 8A:
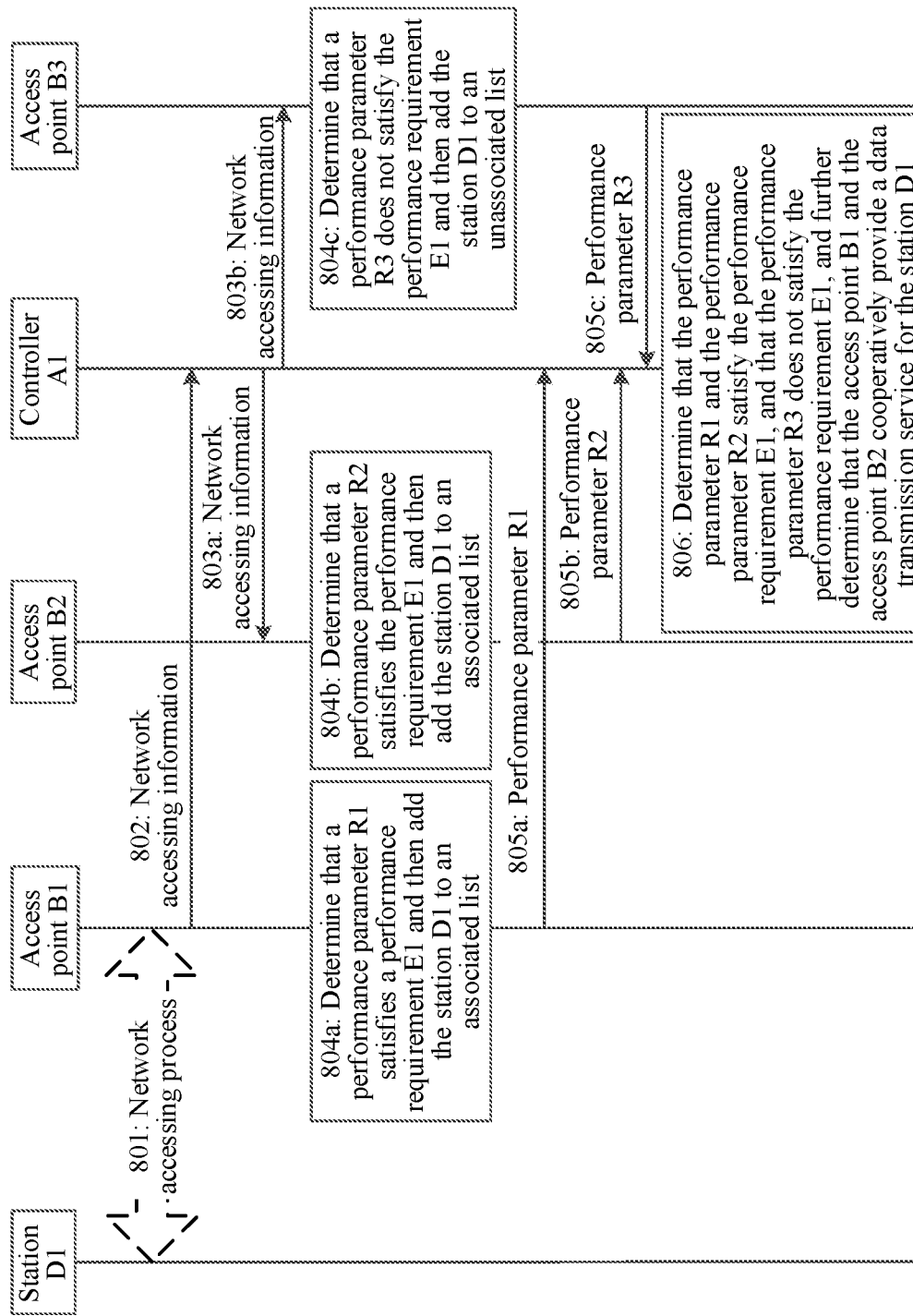
FIG. 8A and FIG. 8B are a flowchart of a data transmission method according to an embodiment of this application.
Figure 8B:
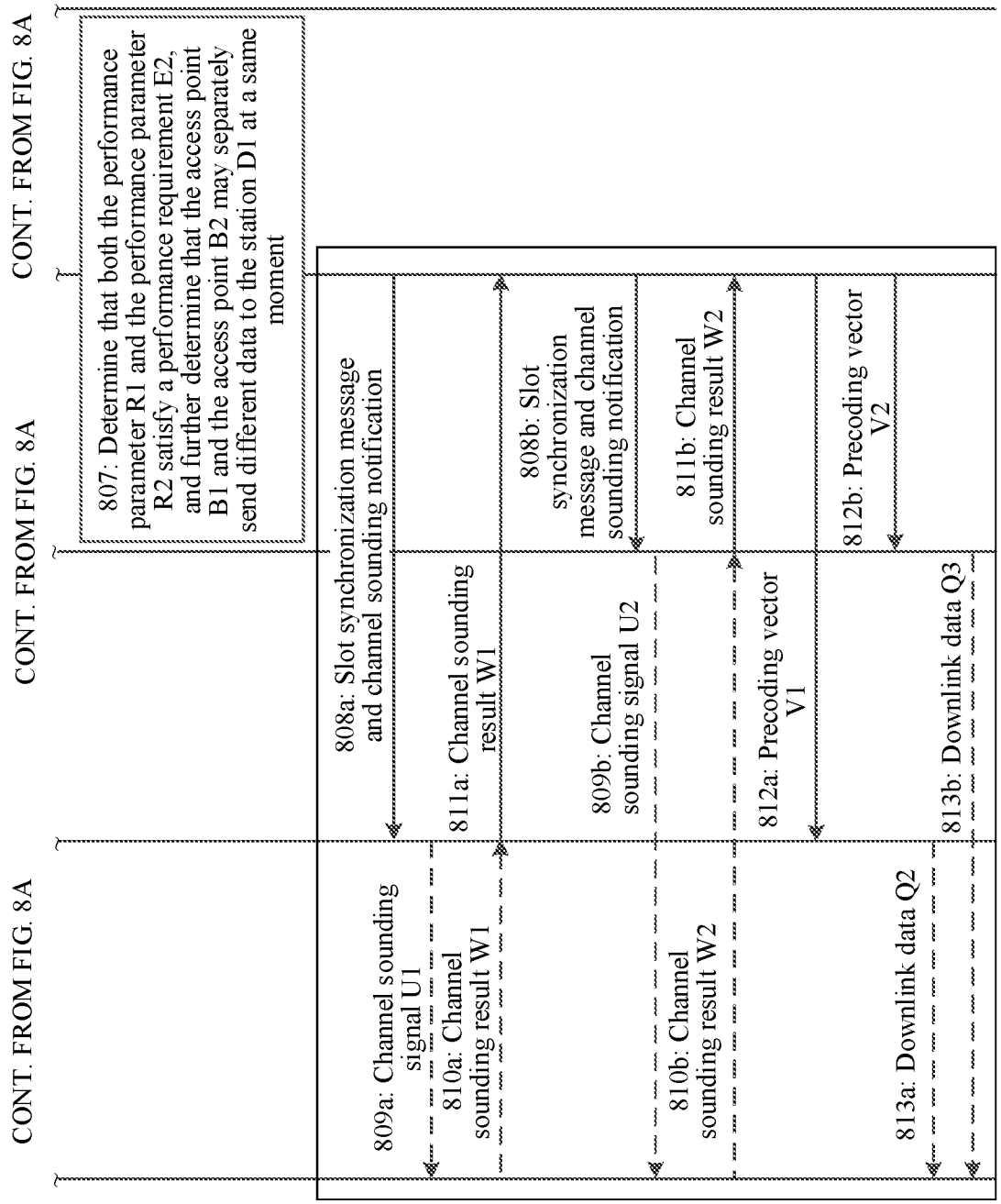

FIG. 8A and FIG. 8B show a data transmission method according to an embodiment of this application. The method may be applied to a scenario in which a channel environment of a station is good.

For step 801 to step 806 shown in FIG. 8A, refer to the foregoing descriptions of step 701 to step 706 in FIG. 7A. Details are not described herein again.

Refer to FIG. 8B. After step 806, the controller A1 may perform step 807 to determine that both the performance parameter R1 and the performance parameter R2 satisfy the performance requirement E2, and further determine that the access point B1 and the access point B2 may send different data to the station D1 at a same moment. For example, the data transmission mode in which different access points may separately send different data to the station at a same moment may be referred to as a distributed MIMO mode. Both the performance parameter R1 and the performance parameter R2 satisfy the performance requirement E2, indicating that a channel environment in which the station D1 is located is good, and the distributed MIMO transmission mode may be used, so as to implement multi-channel concurrency and increase a data throughput of a network.

In some embodiments, when or after determining that the access point B1 and the access point B2 may send different data to the station D1 at the same moment, the controller A1 may perform step 808a to send a slot synchronization message and a channel sounding notification to the access point B1, and may perform step 808b to send a slot synchronization message and a channel sounding notification to the access point B2.

The slot synchronization message indicates an access point to perform slot synchronization or clock synchronization. For example, the slot synchronization message sent in step 808a and the slot synchronization message sent in step 808b include a same calibration clock, so that the access point B1 and the access point B2 can perform slot synchronization or clock synchronization according to the calibration clock. In this way, slot synchronization between the access point B1 and the access point B2 is implemented.

The channel sounding notification indicates an access point to send a channel sounding signal to a station. For example, the channel sounding signal may be an NDP. Therefore, the access point B1 may perform step 809a in response to the channel sounding notification, to send a channel sounding signal U1 to the station D1. When or after receiving the channel sounding signal U1, the station D1 may detect a related indicator (for example, a level or signal strength) of the channel sounding signal U1, and may determine a channel sounding result W1 based on a detection result. The channel sounding result W1 may be a feedback NDP. The station D1 may perform step 810a to send the channel sounding result W1 to the access point B1. Then, the access point B1 may send the channel sounding result W1 to the controller A1 through step 811a. Similarly, the access point B2 may perform step 809b in response to the channel sounding notification, to send a channel sounding signal U2 to the station D1. The station D1 may perform step 810b according to the channel sounding signal U2, to send a channel sounding result W2 to the access point B2. The access point B2 may report the channel sounding result W2 to the controller A1 through step 811b.

When or after obtaining the channel sounding result W1 and the channel sounding result W2, the controller A1 may determine a precoding matrix based on the channel sounding result W1 and the channel sounding result W2. For details, refer to the description of the 802.11be protocol, and details are not described herein again. The determined precoding matrix may include a precoding vector V1 corresponding to the access point B1 and a precoding vector V2 corresponding to the access point B2. Then, the controller A1 may perform step 812a to send the precoding vector V1 to the access point B1, and may perform step 812b to send the precoding vector V2 to the access point B2.

The access point B1 may perform step 813a according to the precoding vector V1, to send downlink data Q2 to the station D1. The access point B2 may perform step 813b according to the precoding vector V2, to send downlink data Q3 to the station D1. Step 813a and step 813b may be performed at the same time.

In addition, the solution of sending downlink data when a channel environment in which a station is located is good is described above. Uplink data may be sent by using the solution described in the embodiment shown in FIG. 7A and FIG. 7B. For details, refer to the foregoing descriptions of step 711a to step 713 in FIG. 7B. Details are not described herein again.

In this way, when a channel environment in which the station is located is good, the plurality of access points connected to the station may simultaneously send different data to the station, thereby increasing a data throughput of a network.

Figure 9A:
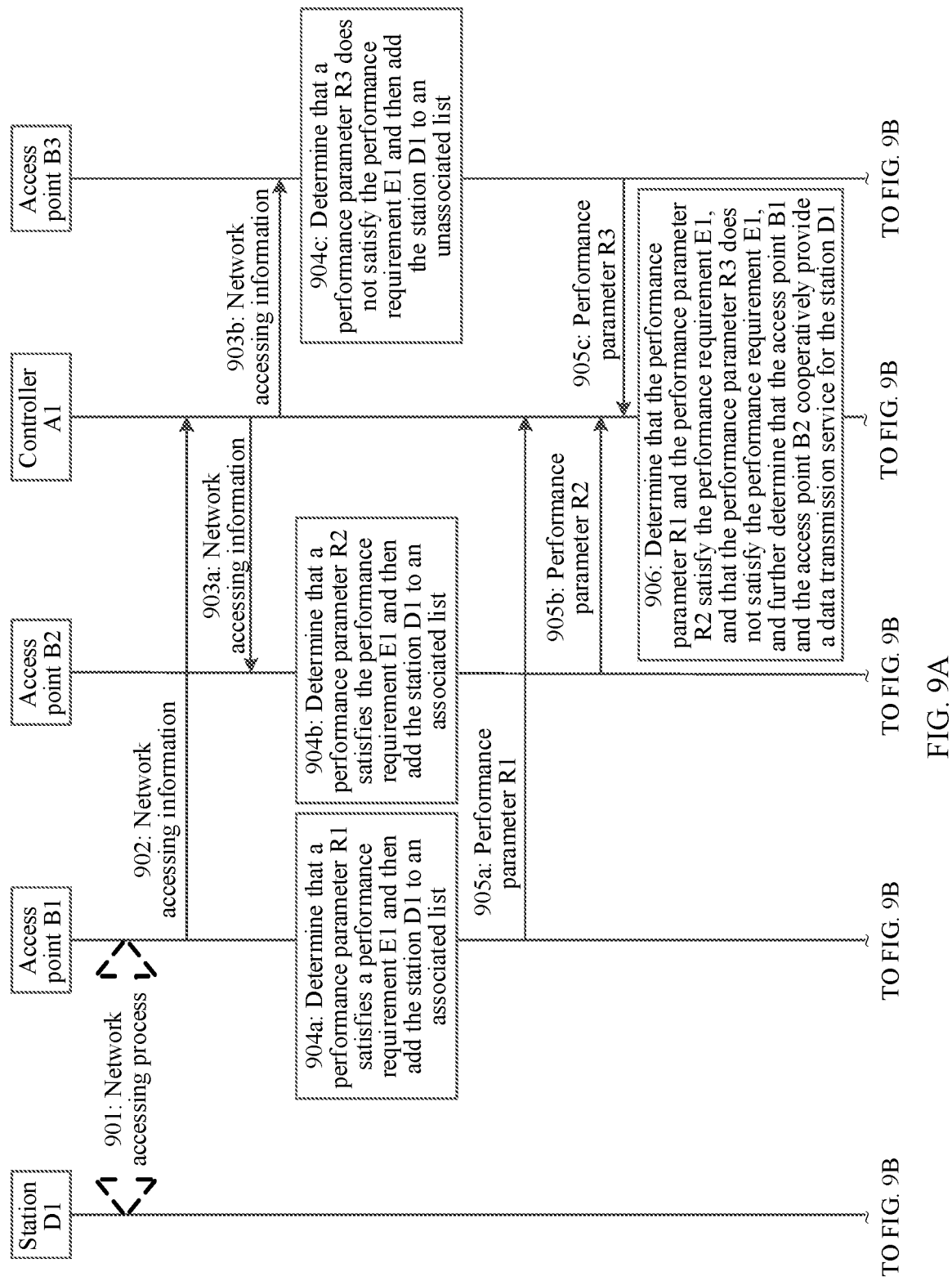
FIG. 9A and FIG. 9B are a flowchart of a data transmission method according to an embodiment of this application.
Figure 9B:
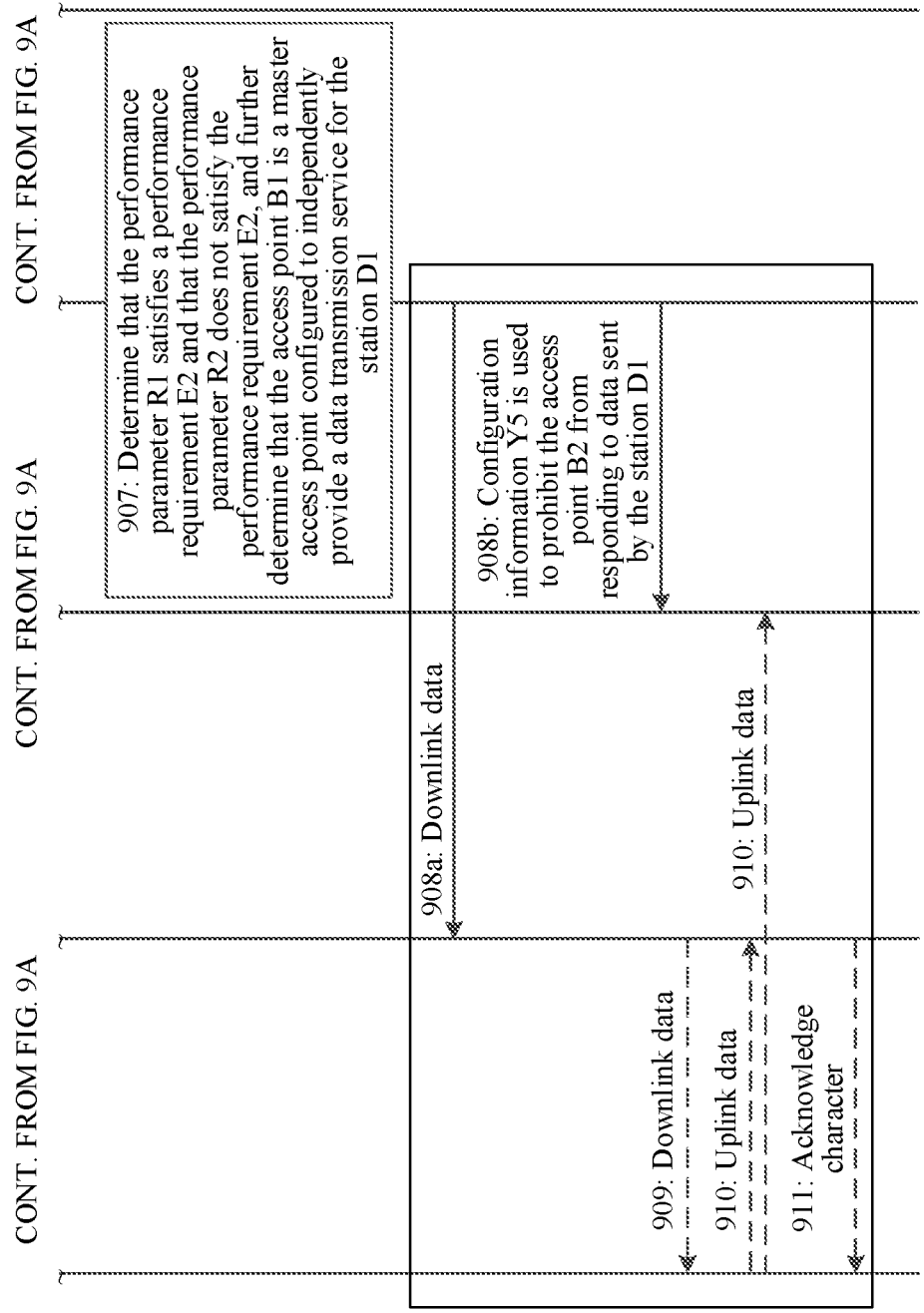

FIG. 9A and FIG. 9B show a data transmission method according to an embodiment of this application. The method may be applied to a scenario in which a channel environment of a station is average.

For step 901 to step 906 shown in FIG. 9A, refer to the foregoing descriptions of step 701 to step 706 in FIG. 7A. Details are not described herein again.

Refer to FIG. 9B. After step 906, the controller A1 may perform step 907 to determine that the performance parameter R1 satisfies the performance requirement E2 and that the performance parameter R2 does not satisfy the performance requirement E2. Further, it is determined that the access point B1 is a primary access point configured to independently provide a data transmission service for the station D1. For example, the data transmission mode in which one of a plurality of access points simultaneously connected to a station serves as a primary access point to independently provide a data transmission service for the station may be referred to as an access point primary/secondary switching mode. The performance parameter R1 satisfies the performance requirement E2, but the performance parameter R2 does not satisfy the performance requirement E2, indicating that a channel environment in which the station D1 is located is average, and an access point having good communication performance with the station is used to independently provide a data transmission service for the station, so that both communication quality of service and overall network overheads can be ensured.

In some embodiments, refer to FIG. 9B. The controller A1 may be used as a network-side device of an access point, and may perform step 908a to send downlink data whose destination is the station D1 to the primary access point, namely, the access point B1. Then, the access point B1 may perform step 909 to send the downlink data to the station D1. However, the controller A1 does not send the downlink data whose destination is the station D1 to the access point B2.

In some embodiments, the controller A1 may be used as a management device of an access point, and may perform step 908b to send configuration information Y5 to the access point B2. The configuration information Y5 is used to prohibit the access point B2 from responding to data sent by the station D1. In other words, the access point B2 no longer returns an acknowledge character (for example, ACK or BA) to the station D1 according to the configuration information Y5 when receiving uplink data sent by the station D1 through step 910. The access point B1 returns an acknowledge character (for example, ACK or BA) to the station D1 when receiving the uplink data sent by the station D1 through step 910. In this way, a conflict caused when a plurality of access points return acknowledge characters can be avoided.

In some embodiments, the controller A1 may not perform step 908b, but the uplink transmission solution in the embodiment shown in FIG. 7A and FIG. 7B is adopted, to avoid a conflict caused when a plurality of access points return acknowledge characters.

According to the data transmission method provided in this embodiment of this application, when a channel environment in which the station is located is average, an access point having good communication performance with the station may be selected to provide a data transmission service for the station, so that both communication quality of service of the station and overall network overheads can be ensured.

Figure 10:
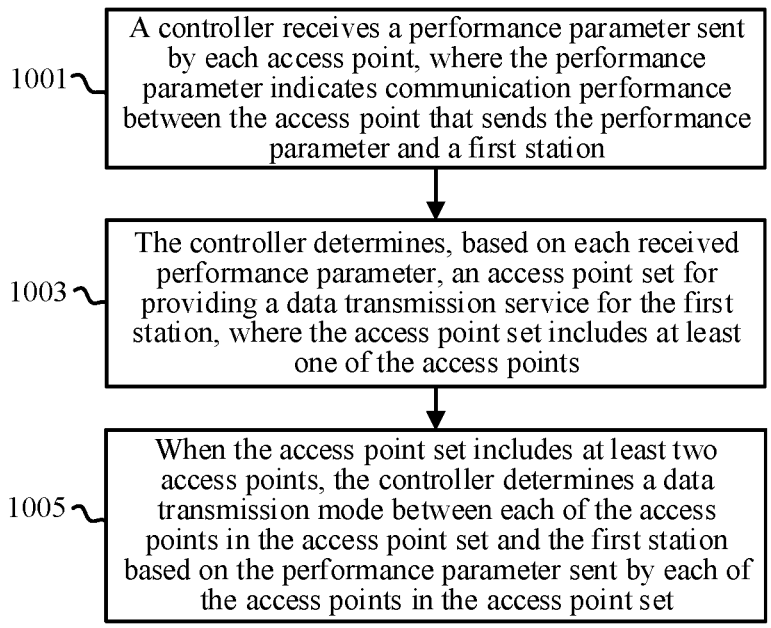
FIG. 10 is a flowchart of a data transmission method according to an embodiment of this application.

In conclusion, embodiments of this application provide a data transmission method. The method may be performed by a controller configured to control a plurality of access points, for example, the controller A1 described above. Refer to FIG. 10. The method may include the following steps.

Step 1001: The controller receives a performance parameter sent by each of the access points, where the performance parameter indicates communication performance between the access point that sends the performance parameter and a first station. In an example, for implementation of step 1001, refer to the foregoing descriptions of step 705a to step 705c in FIG. 7A. Details are not described herein again.

Step 1003: The controller determines, based on each received performance parameter, an access point set configured to provide a data transmission service for the first station, where the access point set includes at least one of the plurality of access points. In an example, for implementation of step 1003, refer to the foregoing description of step 706 in FIG. 7A.

Step 1005: When the access point set includes at least two access points, the controller determines a data transmission mode between each of the access points in the access point set and the first station based on the performance parameter sent by each of the access points in the access point set. In an example, for implementation of step 1005, refer to the foregoing description of step 707 in FIG. 7B, step 807 in FIG. 8B, or step 907 in FIG. 9B.

In some embodiments, the performance parameter includes at least one of a received signal strength indication RSSI of a signal sent by the first station and received by the access point, and load information of the access point. For example, the performance parameter sent by any access point in the determined access point set satisfies that the RSSI is greater than a preset strength threshold, and the load information is less than a preset load threshold.

In some embodiments, the controller is independent of each of the plurality of access points, or the controller is integrated into one of the plurality of access points.

In some embodiments, when the controller is independent of each of the plurality of access points, the controller receives, over an optical link or a Wi-Fi channel, the performance parameter sent by each of the access points; or when the controller is integrated into one of the plurality of access points, the controller receives, over an optical link or a Wi-Fi channel, the performance parameter sent by each of the access points except the access point in which the controller is located.

In some embodiments, the plurality of access points include a first access point and a second access point, and the first station accesses a network through the first access point; and the method further includes: receiving, by the controller, network accessing information of the first station from the first access point; and sending, by the controller, the network accessing information to the second access point. For details, refer to the foregoing descriptions of step 701 to step 703b in FIG. 7A.

For example, the network accessing information includes association request information and a key.

For example, the plurality of access points include a same basic service set identifier BSSID.

In some embodiments, the determining, by the controller, a data transmission mode between each of the access points in the access point set and the first station based on the performance parameter sent by each of the access points in the access point set includes: when the performance parameter corresponding to each of the access points in the access point set does not satisfy a preset performance requirement, determining that different access points in the access point set separately send same data to the first station at different moments. For details, refer to the foregoing descriptions of steps 707 to 710 in FIG. 7B.

In some embodiments, the determining, by the controller, a data transmission mode between each of the access points in the access point set and the first station based on the performance parameter sent by each of the access points in the access point set includes: when the performance parameter corresponding to each of the access points in the access point set satisfies a preset performance requirement, determining that different access points in the access point set separately send different data to the first station at a same moment. For details, refer to the foregoing descriptions of steps 807 to 813b in FIG. 8B.

In some embodiments, the determining, by the controller, a data transmission mode between each of the access points in the access point set and the first station based on the performance parameter sent by each of the access points in the access point set includes: when a performance parameter of a third access point in the access point set satisfies a preset performance requirement, and access points in the access point set except the third access point do not satisfy the performance requirement, configuring the third access point as a primary access point in the access point set, where the primary access point is configured to independently send data to the first station. For details, refer to the foregoing descriptions of steps 907 to 909 in FIG. 9B.

For example, when receiving first data sent by the first station, the primary access point is further configured to send an acknowledge character corresponding to the first data to the first station. For details, refer to the foregoing descriptions of steps 908b to 911 in FIG. 9B.

In some embodiments, the access point set includes a fourth access point and a fifth access point; and the determining, by the controller, a data transmission mode between each of the access points in the access point set and the first station based on the performance parameter sent by each of the access points in the access point set includes: configuring a sending moment at which the fourth access point sends uplink resource configuration information to the first station as a first moment; and configuring a sending moment at which the fifth access point sends the uplink resource configuration information to the first station as a second moment, where the second moment is later than the first moment; and when the first station sends uplink data at the second moment in response to the uplink resource configuration information sent by the fourth access point, the fifth access point no longer sends the uplink resource configuration information to the first station. For details, refer to the foregoing descriptions of steps 711*a* to 713 in FIG. 7B.

According to the data transmission method provided in this embodiment of this application, based on a channel environment in which a station is located, one or more service access points may be selected for the station, and a data transmission mode between a plurality of service access points and the station may be selected, so that an optimal network access mode and an optimal data transmission mode are ensured for the station, thereby improving communication experience of users.

Figure 11:
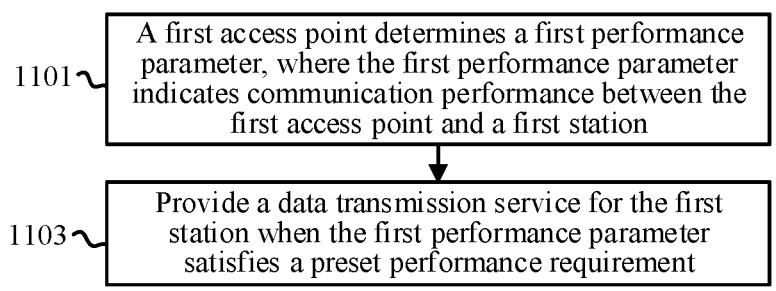
FIG. 11 is a flowchart of a data transmission method according to an embodiment of this application.

An embodiment of this application provides a data transmission method, which may be applied to a first access point in a plurality of access points controlled by a controller, for example, the access point B1 described above. Refer to FIG. 11. The method includes the following steps.

Step 1101: The first access point determines a first performance parameter, where the first performance parameter indicates communication performance between the first access point and a first station. In an example, for implementation of step 1101, refer to the foregoing descriptions of steps 704*a* to 704*c* in FIG. 7A.

Step 1103: Provide a data transmission service for the first station when the first performance parameter satisfies a preset performance requirement. In an example, for implementation of step 1103, refer to the foregoing descriptions of steps 704*a* to 706 in FIG. 7A.

In some embodiments, the method further includes: sending, by the first access point, network accessing information to the controller, where the network accessing information is information obtained by the first access point when the first station accesses a network through the first access point. For details, refer to the foregoing descriptions of steps 702 to 703*b* in FIG. 7A. Details are not described herein again.

In some embodiments, the plurality of access points further include a second access point; the first station accesses a network through the second access point; and the method further includes: receiving, by the first access point, network accessing information of the first station from the controller, where the network accessing information is received by the controller from the second access point. For details, refer to the foregoing description of step 703*a* in FIG. 7A.

In some embodiments, the network accessing information includes association request information and a key.

According to the data transmission method provided in this embodiment of this application, an access point can determine, based on a channel environment between the access point and a station, whether to provide a network service for the station, thereby ensuring both network quality of service of the station and overall network overheads.

Figure 12:
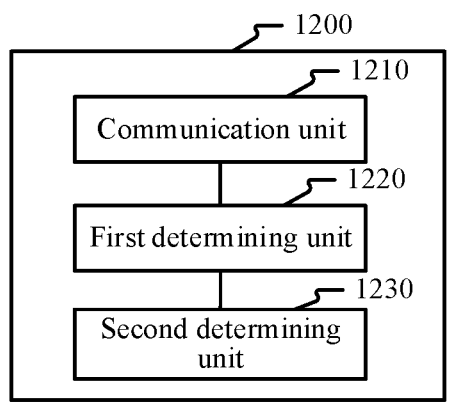
FIG. 12 is a schematic diagram of a structure of a data transmission apparatus according to an embodiment of this application.

Refer to FIG. 12. An embodiment of this application provides a data transmission apparatus 1200, including: a communication unit 1210, a first determining unit 1220, and a second determining unit 1230.

The communication unit 1210 is configured to receive a performance parameter sent by each of the access points, where the performance parameter indicates communication performance between the access point that sends the performance parameter and a first station.

The first determining unit 1220 is configured to determine, based on each received performance parameter, an access point set configured to provide a data transmission service for the first station, where the access point set includes at least one of the plurality of access points.

The second determining unit 1230 is configured to determine, when the access point set includes at least two access points, a data transmission mode between each of the access points in the access point set and the first station based on the performance parameter sent by each of the access points in the access point set.

For functions of functional units of the apparatus 1200, refer to the foregoing description of the method embodiment shown in FIG. 10. Details are not described herein again.

According to the data transmission apparatus provided in this embodiment of this application, based on a channel environment in which a station is located, one or more service access points may be selected for the station, and a data transmission mode between a plurality of service access points and the station may be selected, so that an optimal network access mode and an optimal data transmission mode are ensured for the station, thereby improving communication experience of users.

Figure 13:
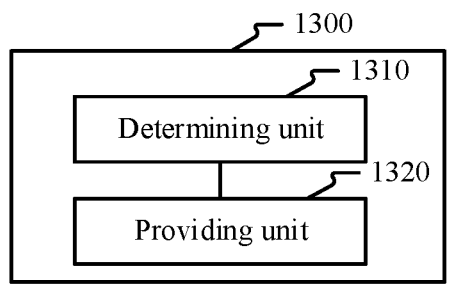
FIG. 13 is a schematic diagram of a structure of a data transmission apparatus according to an embodiment of this application.

Refer to FIG. 13. An embodiment of this application provides a data transmission apparatus 1300, including: a determining unit 1310 and a providing unit 1320.

The determining unit 1310 is configured to determine a first performance parameter, where the first performance parameter indicates communication performance between the apparatus and a first station.

The providing unit 1320 is configured to provide a data transmission service for the first station when the first performance parameter satisfies a preset performance requirement.

For functions of functional units of the apparatus 1300, refer to the foregoing description of the method embodiment shown in FIG. 11. Details are not described herein again.

The data transmission apparatus provided in this embodiment of this application can determine, based on a channel environment between the data transmission apparatus and a station, whether to provide a network service for the station, thereby ensuring both network quality of service of the station and overall network overheads.

The apparatus provided in embodiments of this application is mainly described above from a perspective of a method process. It may be understood that, to implement the foregoing functions, each electronic device includes a corresponding hardware structure and/or software module for implementing each function. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 14:
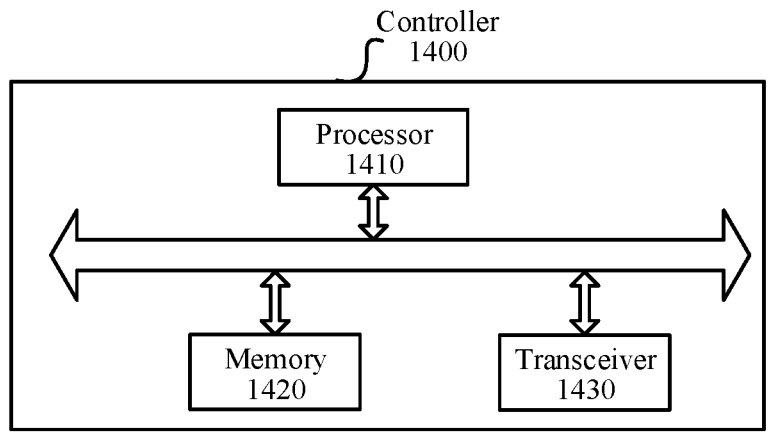
FIG. 14 is a schematic block diagram of a controller according to an embodiment of this application.

Refer to FIG. 14. An embodiment of this application provides a controller 1400. The controller 1400 may perform the operations performed by the controller A1 in the method embodiments shown in FIG. 4, FIG. 6, FIG. 7A and FIG. 7B, FIG. 8A and FIG. 8B, FIG. 9A and FIG. 9B, or FIG. 10. The controller 1400 may include a processor 1410, a memory 1420, and a transceiver 1430. The memory 1420 stores instructions, and the instructions may be executed by the processor 1410. When the instructions are executed by the processor 1410, the controller 1400 may perform the operations performed by the controller A1 in the method embodiments shown in FIG. 4, FIG. 6, FIG. 7A and FIG. 7B, FIG. 8A and FIG. 8B, FIG. 9A and FIG. 9B, or FIG. 10. Specifically, the processor 1410 may perform a data processing operation, and the transceiver 1430 may perform a data sending and/or receiving operation.

Figure 15:
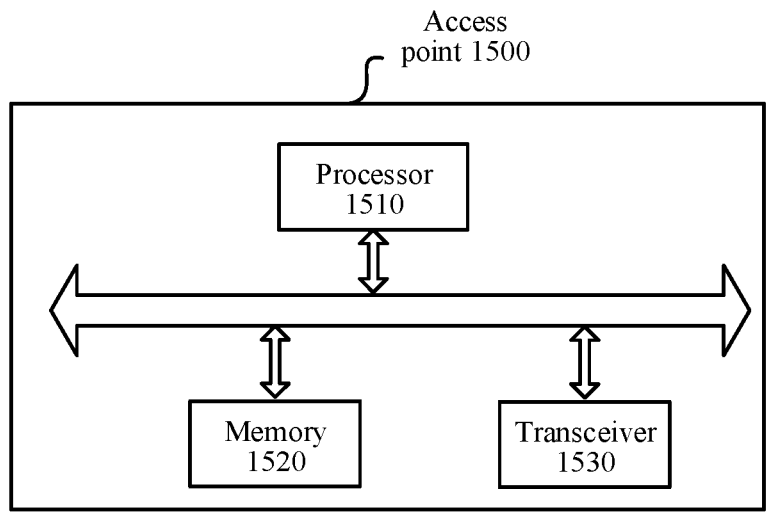
FIG. 15 is a schematic block diagram of an access point according to an embodiment of this application.

Refer to FIG. 15. An embodiment of this application provides an access point 1500. The access point 1500 may perform the operations performed by the access point in the method embodiments shown in FIG. 4, FIG. 6, FIG. 7A and FIG. 7B, FIG. 8A and FIG. 8B, FIG. 9A and FIG. 9B, or FIG. 11, for example, the operations performed by the access point B1. The access point 1500 may include a processor 1510, a memory 1520, and a transceiver 1530. The memory 1520 stores instructions, and the instructions may be executed by the processor 1510. When the instructions are executed by the processor 1510, the access point 1500 may perform the operations performed by the access point in the method embodiments shown in FIG. 4, FIG. 6, FIG. 7A and FIG. 7B, FIG. 8A and FIG. 8B, FIG. 9A and FIG. 9B, or FIG. 11, for example, the operations performed by the access point B1. Specifically, the processor 1510 may perform a data processing operation, and the transceiver 1530 may perform a data sending and/or receiving operation.

Figure 16:
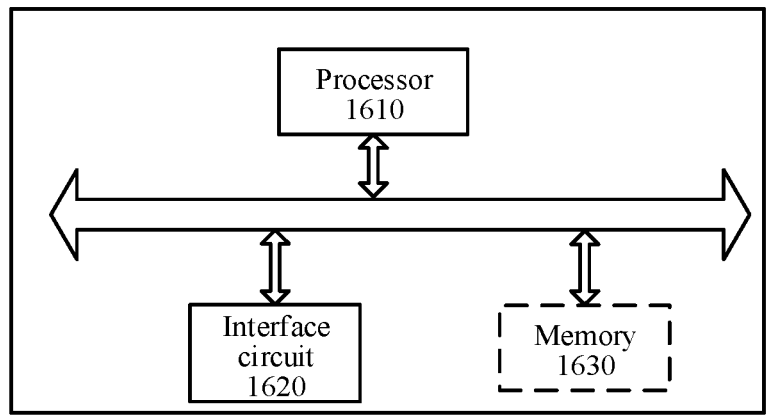
FIG. 16 is a schematic block diagram of a chip system according to an embodiment of this application.

Refer to FIG. 16. An embodiment of this application provides a chip system, which may be configured in the foregoing controller A1. As shown in FIG. 16, the chip system includes a processor 1610 and an interface circuit 1620. The processor 1610 is connected to the interface circuit 1620, and is configured to perform the operations performed by the controller A1 in the method embodiments shown in FIG. 4, FIG. 6, FIG. 7A and FIG. 7B, FIG. 8A and FIG. 8B, FIG. 9A and FIG. 9B, or FIG. 10.

In some embodiments, the chip system further includes a memory 1630. The memory stores instructions, and the instructions may be executed by the processor 1610. When the instructions are executed by the processor 1610, the chip system may perform the operations performed by the controller A1 in the method embodiments shown in FIG. 4, FIG. 6, FIG. 7A and FIG. 7B, FIG. 8A and FIG. 8B, FIG. 9A and FIG. 9B, or FIG. 10.

Still refer to FIG. 16. An embodiment of this application provides a chip system, which may be configured in the access point described above, for example, the access point B1 or the access point B2. As shown in FIG. 16, the chip system includes a processor 1610 and an interface circuit 1620. The processor 1610 is connected to the interface circuit 1620, and is configured to perform the operations performed by the access point in the method embodiments shown in FIG. 4, FIG. 6, FIG. 7A and FIG. 7B, FIG. 8A and FIG. 8B, FIG. 9A and FIG. 9B, or FIG. 11.

In some embodiments, the chip system further includes a memory 1630. The memory stores instructions, and the instructions may be executed by the processor 1610. When the instructions are executed by the processor 1610, the chip system may perform the operations performed by the access point in the method embodiments shown in FIG. 4, FIG. 6, FIG. 7A and FIG. 7B, FIG. 8A and FIG. 8B, FIG. 9A and FIG. 9B, or FIG. 11.

It may be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field-programmable gate array (field-programmable gate array, FPGA) or another programmable logic device, a transistor logic device, a hardware component, or any combination thereof. The general-purpose processor may be a microprocessor or any regular processor.

The method steps in embodiments of this application may be implemented by hardware, or may be implemented by a processor executing software instructions. The software instructions may include corresponding software modules. The software modules may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all of some of the procedures or functions according to embodiments of this application are generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

It may be understood that various numbers in embodiments of this application are merely used for differentiation for ease of description, and are not used to limit the scope of embodiments of this application.

What is claimed is:

1. An access method for a wireless network, wherein the wireless network comprises a controller and a plurality of access points the method comprises:
    receiving, by the controller, a performance parameter sent by an access point of the plurality of access points, wherein the performance parameter indicates communication performance between the access point that sends the performance parameter and a station;

determining, by the controller based on the received performance parameter, a first access point of the plurality of access points;

receiving, by the controller, association request information and a key of the station from the first access point; and sending, by the controller, the association request information and the key to a second access point of the plurality of access points.

2. The method according to claim 1, wherein the performance parameter comprises at least one of a received signal strength indication (RSSI) of a signal sent by the station and received by the access point, or load information of the access point.

3. The method according to claim 2, wherein the performance parameter sent by the access point satisfies at least one of the following: that the RSSI is greater than a preset strength threshold, or that the load information is less than a preset load threshold.

4. The method according to claim 1, wherein the controller is independent of each of the plurality of access points, or the controller is integrated into one of the plurality of access points.

5. The method according to claim 1, wherein when the controller is independent of each of the plurality of access points, receiving, by the controller over an optical link or a Wi-Fi channel, the performance parameter sent by each of the plurality of access points; or when the controller is integrated into one of the plurality of access points, receiving, by the controller over an optical link or a Wi-Fi channel, the performance parameter sent by each of the plurality of access points except the access point in which the controller is located.

6. The method according to claim 1, wherein the plurality of access points comprise a same basic service set identifier (BSSID).

7. The method according to claim 1, wherein the method comprises:

determining, by the controller based on each received performance parameter, an access point set configured to provide a data transmission service for the station, wherein the access point set comprises at least one of the plurality of access points; and when the performance parameter corresponding to each of the access points in the access point set does not satisfy a preset performance requirement, determining that different access points in the access point set separately send same data to the first station at different moments.

8. The method according to claim 1, wherein the method comprises:

determining, by the controller based on each received performance parameter, an access point set configured to provide a data transmission service for the station, wherein the access point set comprises at least one of the plurality of access points; and when the performance parameter corresponding to each of the access points in the access point set satisfies a preset performance requirement, determining that different access points in the access point set separately send different data to the first station at a same moment.

9. The method according to claim 1, wherein the association request information comprises an association request frame.

10. The method according to claim 1, wherein the controller sending the association request information and the key to the second access point comprises:

the controller sending the association request information and the key to each access point it controls.

11. The method according to claim 1, wherein the key is negotiated between the station and the first access point.

12. The method according to claim 1, comprising:

receiving, by the controller, a channel sounding result from an access point of the plurality of access points.

13. A controller, comprising:

at least one processor; and one or more memories coupled to the at least one processor and storing programming instructions for execution by the at least one processor to cause the controller to perform operations comprising:

receiving, by the controller, a performance parameter sent by an access point of a plurality of access points, wherein the performance parameter indicates communication performance between the access point that sends the performance parameter and a station;

determining, by the controller based on each received performance parameter, a first access point of the plurality of access points; and receiving by the controller association request information and a key of the station from the first access point; and sending, by the controller, the association request information and the key to a second access point of the plurality of access points.

14. The controller according to claim 13, wherein the performance parameter comprises at least one of a RSSI of a signal sent by the station and received by the access point, or load information of the access point.

15. The controller according to claim 13, wherein the plurality of access points comprise a same basic service set identifier (BSSID).

16. The controller according to claim 13, wherein the association request information comprises an association request frame.

17. A communication system, comprises a controller and a plurality of access points, the controller comprises at least one processor and one or more memories coupled to the at least one processor, the one or more memories store programming instructions for execution by the at least one processor to cause the controller to perform operations comprising:

receiving a performance parameter sent by an access point of a plurality of access points, wherein the performance parameter indicates communication performance between the access point that sends the performance parameter and a station;

determining, by the controller based on each received performance parameter, a first access point of the plurality of access points;

receiving, by the controller, association request information and a key of the station from the first access point, wherein the association request information and the key of the station are obtained by the first access point; and sending, by the controller, the association request information and the key to a second access point of the plurality of access points.

18. The communication system according to claim 17, wherein the association request information comprises an association request frame.

19. The communication system according to claim 17, wherein the controller and the access point is communicated through an optical fiber.

20. The communication system according to claim 17, wherein the plurality of access points comprise a same basic service set identifier (BSSID).

* * * * *